US005900859A

United States Patent [19]

Takishita et al.

[11] Patent Number: 5,900,859

[45] Date of Patent: May 4, 1999

[54] SWITCH-IMAGE DISPLAY METHOD AND DISPLAY APPARATUS THEREOF

[75] Inventors: Hideyuki Takishita; Mitsuru Kawahata, both of Iwaki, Japan

[73] Assignee: Alpine Electronics, Inc., Japan

[21] Appl. No.: 08/730,389

[22] Filed: Oct. 15, 1996

[30] Foreign Application Priority Data

Oct. 30, 1995 [JP] Japan .................................... 7-281357

[51] Int. Cl.[6] .................................................... G06K 15/18

[52] U.S. Cl. .......................... 345/113; 345/146; 345/343; 345/345

[58] Field of Search ............................... 345/1, 113, 115, 345/120, 121, 203, 343, 344, 345, 146, 326, 356, 357

[56] References Cited

U.S. PATENT DOCUMENTS

| | | | |
|---|---|---|---|
| 4,414,628 | 11/1983 | Ahuja et al. | 345/344 |
| 4,555,775 | 11/1985 | Pike | 364/900 |
| 4,586,035 | 4/1986 | Baker et al. | 345/146 |
| 4,749,990 | 6/1988 | Birkner | 340/799 |
| 4,819,189 | 4/1989 | Kikuchi et al. | 345/345 |
| 4,954,818 | 9/1990 | Nakane et al. | 340/721 |
| 5,001,469 | 3/1991 | Pappas et al. | 340/721 |
| 5,129,055 | 7/1992 | Yamazaki et al. | 395/158 |
| 5,130,801 | 7/1992 | Yamaguchi | 358/183 |
| 5,191,644 | 3/1993 | Takeda | 395/158 |
| 5,237,653 | 8/1993 | Noguchi et al. | 345/345 |
| 5,351,067 | 9/1994 | Lumelsky et al. | 345/191 |
| 5,463,728 | 10/1995 | Blahut et al. | 395/158 |
| 5,475,812 | 12/1995 | Corona et al. | 395/158 |
| 5,479,599 | 12/1995 | Rockwell et al. | 395/155 |
| 5,553,211 | 9/1996 | Uotani | 395/135 |
| 5,561,755 | 10/1996 | Bradley | 395/157 |
| 5,644,693 | 7/1997 | Fitzgerald et al. | 345/326 |
| 5,687,313 | 11/1997 | Hirosawa et al. | 395/200.54 |

OTHER PUBLICATIONS

SYBEX Inc. publication title 'Mastering Windows 3.1', Special Edition Library of Congress Card No. 91–68096, Jan. 1993.

*Primary Examiner*—Mark K. Zimmerman
*Assistant Examiner*—Vincent E. Kovalick
*Attorney, Agent, or Firm*—Brinks Hofer Gilson & Lione

[57] ABSTRACT

Desired switch images are freely shifted and grouped by the operator, so that the switch images can be superimposed to be displayed. A plurality of layers arranged from the lowest layer to the highest layer are provided for the respective switch images. The layer numbers and the switch image data of the switch images corresponding to the respective layer numbers are managed. If switch images are superimposed on each other, the higher-layer switch image is displayed on the lower-layer switch image on the display screen. If a shifted switch image is not superimposed on any of the previously-superimposed images, the layer numbers of all of the switch images higher than the layer number of the shifted switch image are subtracted by one, and also, the layer number of the shifted switch image is set to be the highest number. Then, the shifted switch image is written into the corresponding zone of the screen memory, so that the overall shifted switch image can be displayed on the frontmost position of the screen.

21 Claims, 16 Drawing Sheets

SWITCH-IMAGE DISPLAY METHOD AND DISPLAY APPARATUS THEREOF

BACKGROUND OF THE INVENTION

1. Field of the Invention

The present invention relates generally to a switch-image display method and a switch-image display apparatus. More particularly, the invention relates to a switch-image display method for superimposing a plurality of switch images and displaying them onto a display screen so as to cause a system to perform a predetermined operation. The invention also relates to a switch-image display apparatus using the above-described method.

2. Description of the Related Art

Hitherto, in image display methods, the following technique is available for displaying a plurality of images used for the switching operation (hereinafter referred to as "the switch images") into a display and selecting a desired image so as to cause a system (apparatus) to perform a predetermined operation. In this technique, the following switch-image display methods are available: (1) displaying a plurality of switch images in the fixed positions of the screen in such a manner that the images can be prevented from being superimposed on each other; and (2) shiftably displaying a plurality of switch images on the screen in such a manner that the images can be displaceably superimposed on each other, so that a desired selected switch image can be displayed on the frontmost position of the screen.

However, in the first method, the number of switches to be displayable on one screen is limited. This requires another screen for displaying images which do not fit into one screen, and scrolling or paging is further required to display a desired switch image on the screen, thereby necessitating a troublesome switching operation and causing poor operability.

In the second method, it is possible, on one hand, to display all of the switch images on one screen, but on the other hand, the following problem is encountered when switch images are grouped according to the frequency of the use of images or according to the types of images and displayed on the screen. That is, when a desired image is selected, it is unconditionally displayed on the frontmost position of the screen. This destroys the hierarchical-classification of the superimposed switch images. Further, in the second method, it is impossible to freely shift the switch images to classify them into groups by the operator. Additionally, the images cannot be freely superimposed to be displayed according to the frequency of the use of images or according to the types of switches.

SUMMARY OF THE INVENTION

Accordingly, it is an object of the present invention to provide a switch-image display method in which a desired selected switch image can be avoided from being displayed on the frontmost position of the screen.

It is another object of the present invention to provide a switch-image display method in which the switch images can be freely shifted to be grouped by the operator and can be superimposed and displayed as desired according to the frequency of the use of images or according to the types of switches.

In order to achieve the above objects, according to the present invention, a plurality of layer classes arranged from the lowest layer to the highest layer are provided for the respective switch images, and the layer number and the switch image data of each switch image are managed. If switch images are superimposed on each other, the higher-layer switch image is displayed on the lower-layer switch image. In this case, the individual pixels forming each switch image are checked to determine whether there are any pixels superimposed on a higher-layer switch image. If the answer of the above question is no, the image data of the corresponding pixels is written into the screen memory. On the other hand, if the answer is yes, the image data of the corresponding pixels is not written into the memory. The resulting switch image is thus displayed. With this arrangement, even though a switch image is selected, it can be avoided from being displayed on the frontmost position of the screen unless the structure of the layers of the switch images is changed. This can prevent the destruction of the hierarchical structure of the switch images.

If a predetermined shifted switch image is not superimposed on any of the previously-superimposed switch images, the layer numbers of all of the switch images higher than the layer number of the shifted switch image are subtracted by one, and the layer number of the shifted switch image is set to be the highest number. The shifted switch image is written into the corresponding zone of the screen memory, so that the overall shifted image can be displayed on the frontmost position of the screen. This makes it possible to freely shift a plurality of desired switch images so as to be grouped by the operator, or to freely superimpose the switch images to be displayed according to the frequency of the use in the switch images or according to the types of switches.

There is provided a display-screen management table for storing the layer information of a switch image to be displayed on the individual pixels of the display screen. Further, the following items concerning each switch image are managed: (1) the layer number, (2) the switch image data, (3) the image data of a zone in which the switch image can be displayed assuming that there are no higher-layer switch images including the above-mentioned switch image (lower-layer display image), and (4) the layer information of the lower-layer display image for each pixel. When a switch image is shifted, (1) the screen memory (VRAM) and (2) the lower-layer display image of a higher-layer switch image superimposed on the switch image to be shifted are rewritten by use of the lower-layer display image of the shifted switch image. Also, (1) the contents of the display-screen management table and (2) the layer information of the lower-layer display image of a higher-layer switch image superimposed on the switch image to be shifted are rewritten by use of the layer information of the lower-layer display image of the shifted switch image. In this manner, the lower-layer display image of each switch image and the layer information of the lower-layer display image for each pixel are managed. By use of the lower-layer display image and the layer information, the screen memory (VRAM) and the display-screen management table are rewritten, thereby enabling the faster shifting and superimposing operation.

Further, even though the switch images are superimposed on each other, the layer number of the image designated by a cursor can be found by referring to the display-screen management table. Based on this layer number and the display position of each switch image, the switch image designated by the cursor can be correctly identified. It is thus possible to select the switch image or to shift the image on the display screen.

If a predetermined shifted switch image is superimposed on other switch images which have not been superimposed previously, the lower-layer display image of the shifted switch image is updated by use of the superimposed portion of the other switch image with the shifted switch image. Accordingly, the lower-layer display image of the shifted switch image can be rewritten at high speed.

If a shifted switch image is still superimposed on at least one of the previously-superimposed images, the contents of the screen memory are rewritten so that the higher-layer switch image, the shifted switch image and the lower-layer switch image can be superimposed in the descending layer order so as to be displayed, and the layer information stored in the display-screen management table is rewritten. Simultaneously, the lower-layer display image of a switch image higher than the shifted switch image is updated in accordance with the superimposition state between the shifted image and the higher-layer switch image by use of the shifted image, and the lower-layer display image of the shifted switch image is updated according to the superimposition state between the shifted image and a lower-layer switch image by use of the lower-layer image. With this arrangement, even when the shifted switch image is still superimposed on at least one of the previously-superimposed images, the faster shifting and superimposing operation can be achieved.

DESCRIPTION OF THE PREFERRED EMBODIMENT

(A) Schematic Construction of the Present Invention

Figure 1:
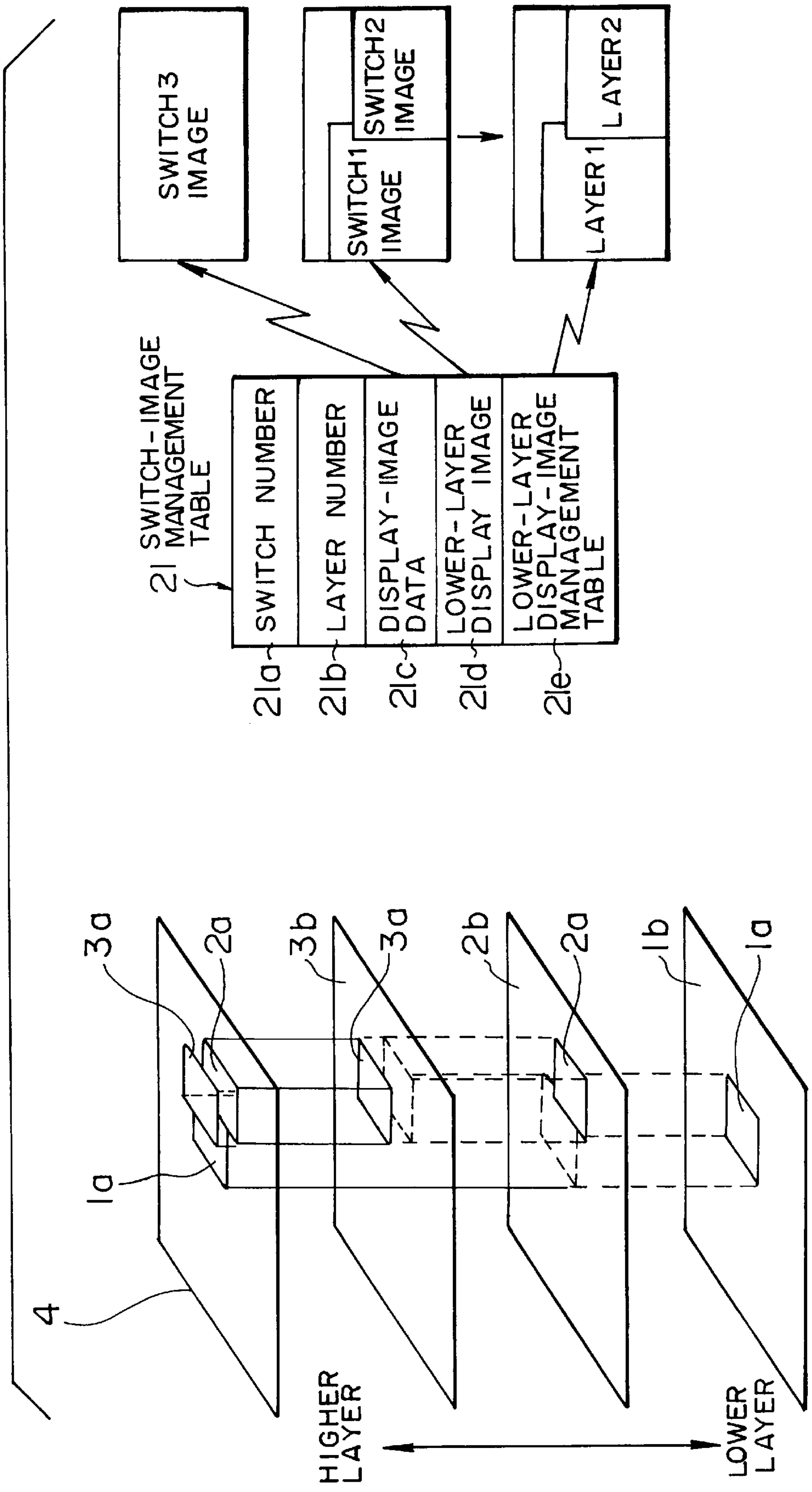
FIG. 1 schematically illustrates the present invention.

Referring to the block diagram shown in FIG. 1, a switch-image display apparatus of the present invention includes switch images 1*a* through 3*a* (switches 1 through 3) of the same size, layers 1*b* through 3*b* (layers 1 through 3), and a display screen 4. The switch images 1*a* through 3*a* to be superimposed to be displayed on the screen 4 are managed assuming that they are placed on independent layers, i.e., on the layers 1 through 3, respectively, each layer having its own number. For displaying the switch images on the screen 4, priority is given to the switch image placed on the highest layer to be displayed on the frontmost position of the screen 4. In the apparatus shown in FIG. 1, the switch image 3*a* placed on the highest layer 3 is displayed on the frontmost position of the screen 4, followed by the switch images 2*a* and 1*a* in order of descending precedence. Namely, among the superimposed switch images, the image having the highest priority (located on the highest layer) is displayed on the frontmost position of the screen 4. More specifically, it is determined whether each of the image on the lowest layer through the image on the highest layer in the ascending order forming the respective switch images 1*a* through 3*a* for each pixel are superimposed on the switch image of the next higher layer. As a result, the switch image is superimposed to be displayed on the screen 4 in such a manner that the image data having the pixels which are not superimposed on the switch image on the next higher layer is written into a screen memory (VRAM) and that the image data having the pixels superimposed on the image on the next higher layer is not written into the memory.

The switch images are shifted (moved from its original position) the corresponding layers. For example, the switch image 2*a* is shifted on the layer 2 and displayed in compliance with the aforedescribed rule. If the shifted switch image is not superimposed on any of the previously-superimposed switch images, the switch image is moved onto the highest layer, which causes the image on the highest layer to be shifted onto the next lower layer. Each of the subsequent images is sequentially shifted to the next lower layer until the layer immediately above the layer on which the shifted switch image has been located is reached. This makes it possible to display the shifted switch image on the frontmost position of the screen 4.

Each switch image is provided with a switch-image management table 21. Written into this table 21 are the switch number 21*a* inherent in each switch, the layer number 21*b* provided for each switch image, the image data 21*c* of each switch image, the lower-layer display image 21*d*, and the lower-layer display-screen management table 21*e*. Accordingly, by referring to the layer number 21*b* of this management table 21, the images are superimposed and displayed in order of precedence, and the layers corresponding to the images are changed. The functions of the lower-layer display image 21*d* and the lower-layer display-image management table 21*e* will be described below.

(B) Construction of the Overall System

Figure 2:
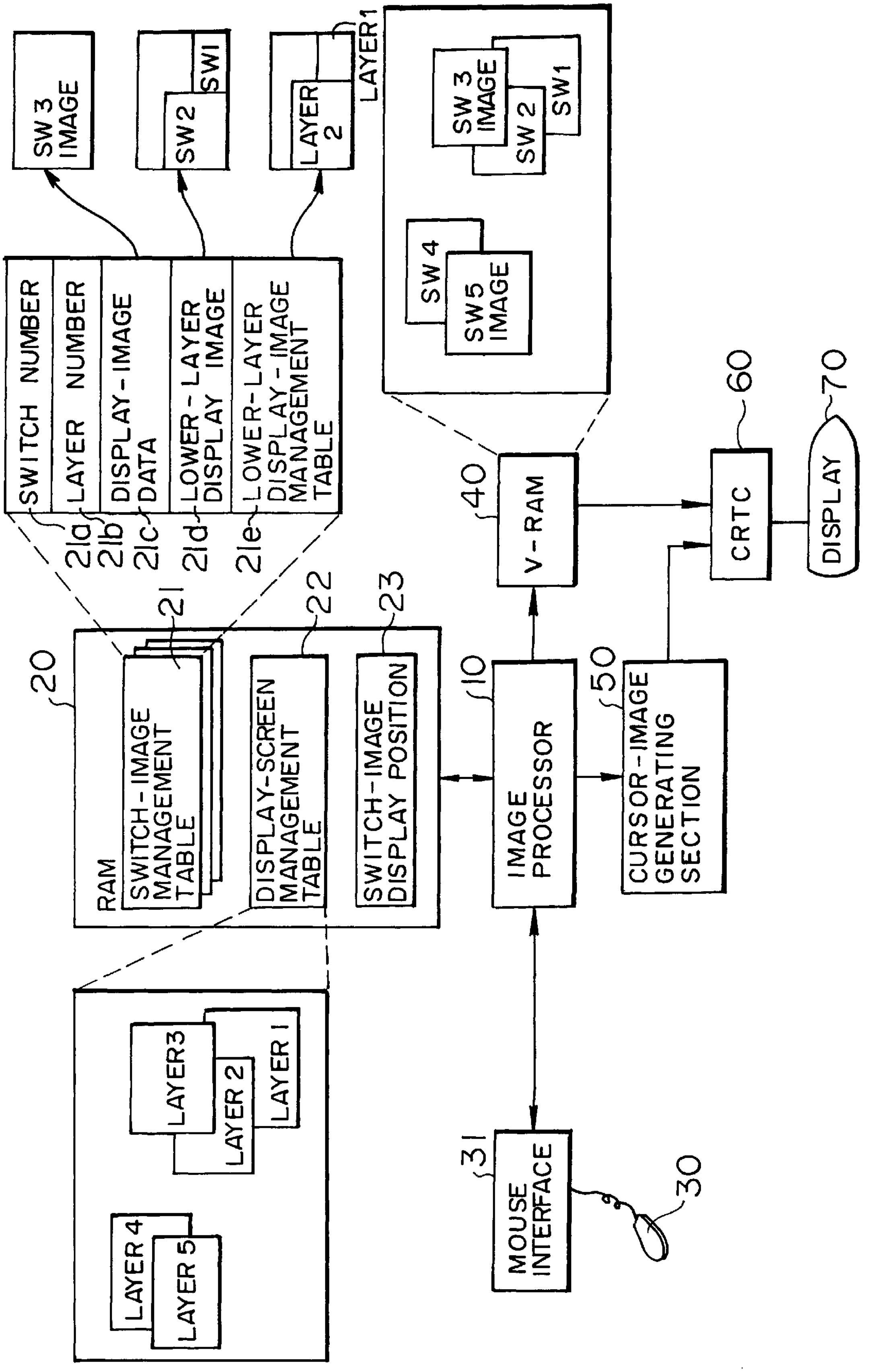
FIG. 2 illustrates the overall construction of the present invention.

FIG. 2 is a schematic diagram illustrating the overall construction of a system formed by the application of the switch-image display method of the present invention. The switch image display apparatus has an image processor 10, a RAM 20 for storing various tables, the switch-image display positions 23 and other data, a mouse 30, a mouse interface 31, a frame memory (VRAM) 40 for storing bit-map image data for one frame generated by the image processor 10, a cursor-image generating section 50 for generating in a predetermined position an image of a cursor shifted through the operation of the mouse 30, a display controller 60, and a display 70, such as a liquid crystal display, a cathode ray tube (CRT) or the like. The display controller 60 reads the bit-map image data from the VRAM 40 by raster scanning and also reads the cursor image from the cursor-image generating section 50 so as to input the bit-map image data and the cursor image into the display 70.

Stored in the RAM 20 are a switch-image management table 21, a display-screen management table 22, data 23 on the display positions of the respective switch images, etc. The switch-image management table 21 is provided with each switch image and stores the following five items of data concerning each image: (1) the switch number 21*a* inherent in each switch image; (2) the layer number 21*b* corresponding to each switch image; (3) the image data 21*c* of each switch image; (4) the image data 21*d* concerning the image zone in which the switch image can be displayed assuming that there are no higher switch images including the switch image (lower-layer display image); and (5) the layer information 21*e* concerning the lower-layer display image for each pixel (lower-layer display-image management table).

Stored in the display-screen management table 22 is the layer information of the switch image to be displayed for the respective pixels in correspondence with the pixels of the screen. For example, if the switch images SW1 through SW5 (the layers 1 through 5) illustrated in FIG. 2 are stored in the VRAM 40 and displayed on the screen, the layer information (the layers 1 through 5) also shown in FIG. 2 is stored in the display-screen management table 22. This table 22 is used for identifying the switch image designated by the cursor. For instance, the layer number of the image zone designated by the cursor is found by referring to the management table 22, so that the switch image designated by the cursor can be identified based on the layer number and the display position data of each switch image. Accordingly, even though the superimposed switch images are displayed, the switch image designated by the cursor can be correctly identified according to the above-described procedure.

(C) Shifting Control of Switch Images

(a) Summary of Shifting Control of Switch Images

Figure 3:
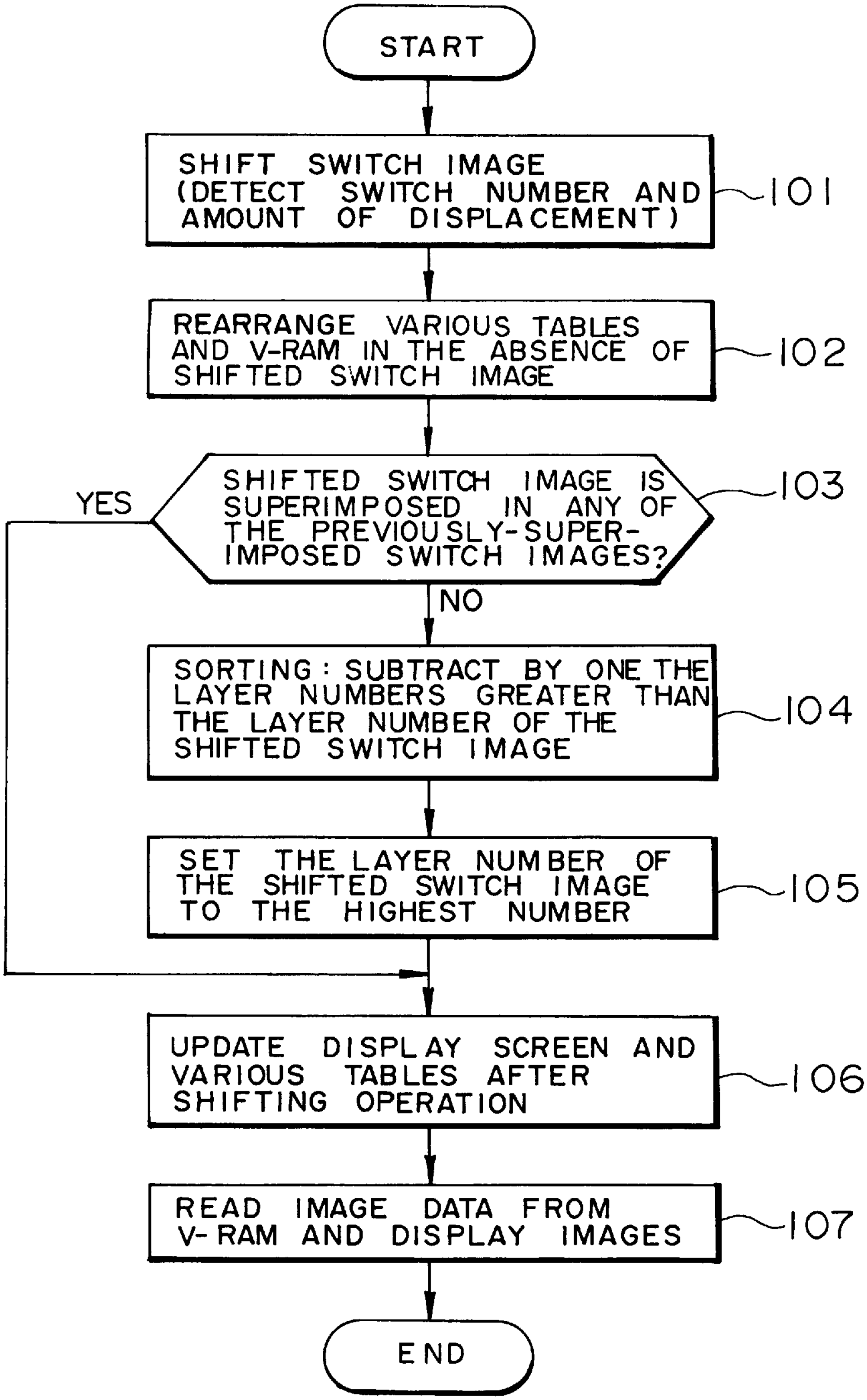
FIG. 3 is a flow chart of the shifting control of switch images.

FIG. 3 is a flow chart schematically illustrating the shifting control of the switch images. In the initial state, the various switch images are displayed on the screen, and the switch-image management tables 21 and the display-screen management table 22 have already been generated and stored in the RAM 20. In this state, a predetermined switch image, for example, the switch image SW2, is selected and shifted (dragged) with the mouse 30. The image processor 10 refers to the display-screen management table 22 so as to determine the layer number of the switch image designated by the cursor with use of the mouse 30. Then, the processor 10 determines, by referring to each switch-image management table 21, the switch image having the above-described layer number and identifies that the switch image has been selected. Further, an amount of the displacement of the switch image with the mouse 30 is obtained in the mouse interface 31, and the display position of the switch image is updated. (step 101)

Upon shifting the switch image SW2, the processor 10 rearranges the various tables (i.e., the management tables 21 of the predetermined switch images and the display-screen management table 22) in the absence of the switch image SW2 (step 102). Subsequently, it is determined whether the shifted switch image is superimposed on any of the previously-superimposed switch images (step 103).

If the answer in step 103 is no, the layer numbers are sorted. More specifically, in the various tables (i.e., all the switch-image management tables 21 and the display-screen management table 22), the layer numbers greater than the layer number of the shifted switch image are searched and subtracted by one (step 104). Thereafter, the layer number of the shifted switch image is set to be the highest layer number (for example, 16, if there are 16 switch images to be superimposable on each other) (step 105). This enables the shifted switch image to be displayed on the frontmost position of the screen 70.

When the processing of step 105 is completed, or when the shifted switch image is found in step 103 to be still superimposed on any of the previously-superimposed switch images, the shifted switch image is written into the VRAM 40, and also, the display-screen management table 22 and the switch-image management tables 21 of the predetermined switch images are updated (step 106). Then, the image data is read from the VRAM 40 and displayed on the screen (step 107).

The image display method of the present invention has been briefly explained, and the processing in each step will now be described in greater detail.

(b) Image Processing Executed in the Absence of the Shifted Switch Image (Step 102)

Figure 4A:
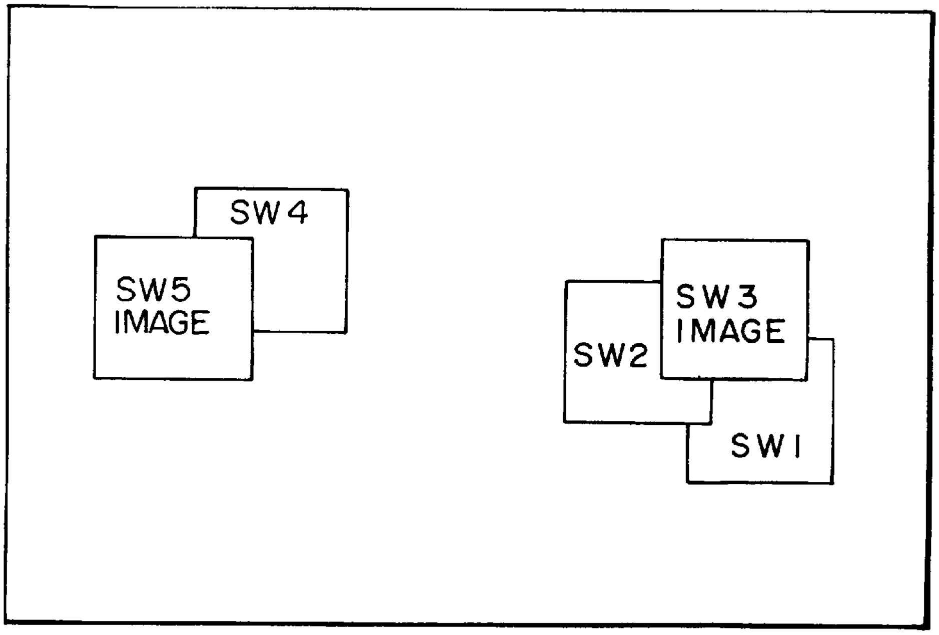
FIGS. 4A and 4B illustrate the display screen and the display-screen management table, respectively.
Figure 4B:
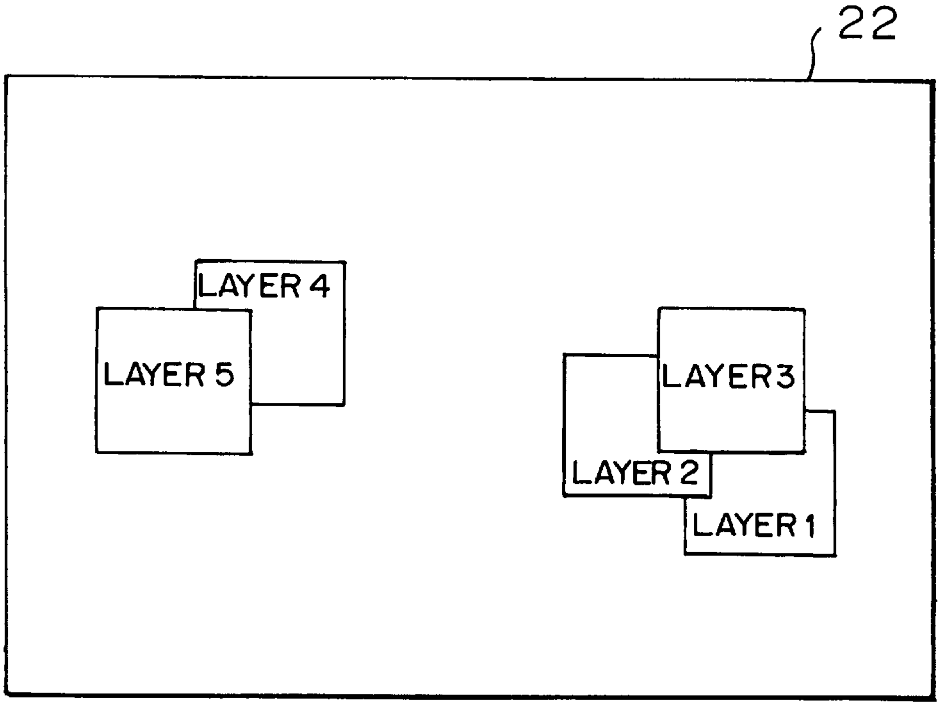
Figure 5:
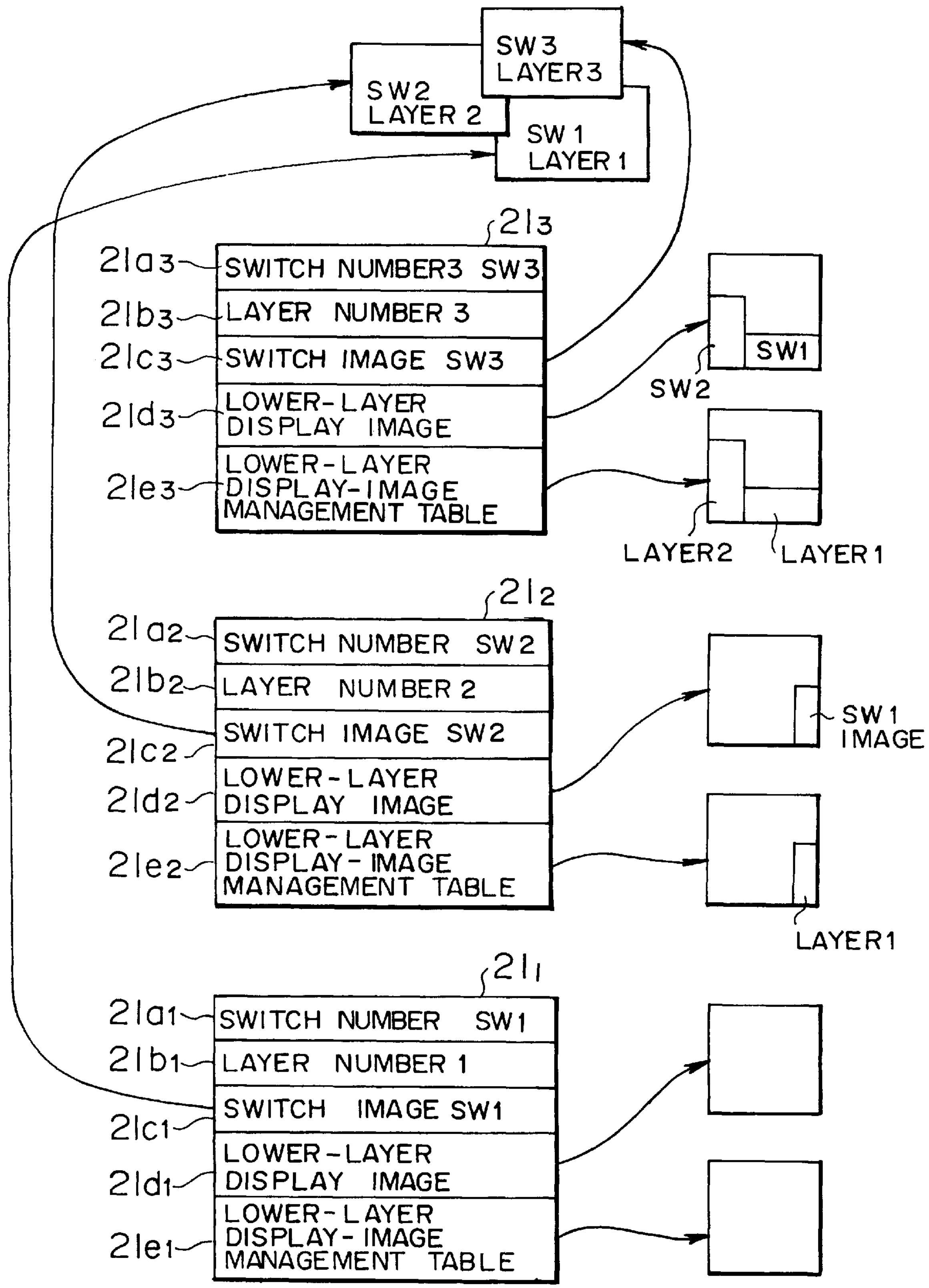
FIG. 5 illustrates the individual switch-image management tables.

Assuming that the switch images SW1 through SW5 (the layers 1 through 5) shown in FIG. 4A are displayed on the screen prior to the shifting operation, the layer information is stored in the display-screen management table 22, as shown in FIG. 4B. Further, written into the switch-image management tables $21_1$ through $21_5$ associated with the respective switches SW1 through SW5 (the layers 1 through 5) are, as illustrated in FIG. 5, (1) the switch number inherent in each switch, (2) the layer number of the layer provided for each switch image, (3) the image data of each switch image, (4) the lower-layer display image, and (5) the lower-layer display-image management table. Only the switch-image management tables $21_1$ through $21_3$ corresponding to the respective switch images SW1 through SW3 are shown in FIG. 5, and the remaining tables $21_4$ and $21_5$ associated with the respective switch images SW4 and SW5 are omitted.

Figure 6A:
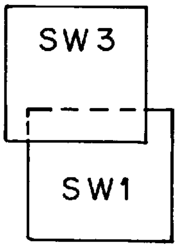
FIGS. 6A through 6C illustrate the updating operation of the lower-layer display images and the lower-layer display-image management tables of the switch images.

In this state, upon shifting the switch image SW2, the processor 10 rearranges the various tables (i.e., the display-screen management table 22 and the management table $21_3$ of the switch image SW3 placed on the layer next higher than the switch image SW2 prior to the shifting operation) in the absence of the switch image SW2. As a consequence, the switch images SW1 and SW3 are superimposed on each other, as shown in FIG. 6A. This further changes the lower-layer display image $21d_3$ of the switch image SW3 which has been superimposed on the switch image SW2 prior to the shifting operation, and also changes the layer information $21e_3$ (the lower-layer display-image management table) of the switch image SW3. At the same time, the contents of the VRAM 40 and the display-screen management table 22 are modified. These tables are thus rewritten according to the following processes (1) through (4).

Figure 6B:
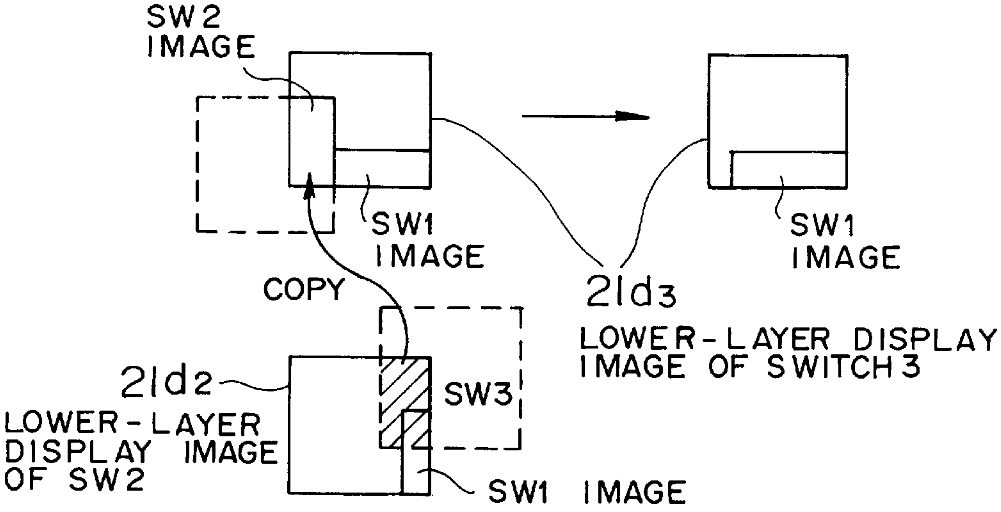

(1) In the absence of the shifted switch image SW2, the lower-layer display image $21d_3$ of the switch image SW3 superimposed on the switch image SW2 prior to the shifting operation should be changed from the left-hand side image to the right-hand side image of FIG. 6B. This requires the rewriting of the lower-layer display image 21$d_3$ shown in the left-hand side by the right-hand side of FIG. 6B. Accordingly, the portion of the lower-layer display image 21$d_2$ of the shifted switch image SW2 superimposed on the switch image SW3 (hatched portion of FIG. 6B) is copied onto the portion of the lower-layer display image 21$d_3$ of the switch image SW3 superimposed on the image SW2. This makes it possible to obtain the lower-layer display image 21$d_3$ of the switch image SW3 free of the shifted switch image SW2, as shown in the right-hand side of FIG. 6B.

Figure 6C:
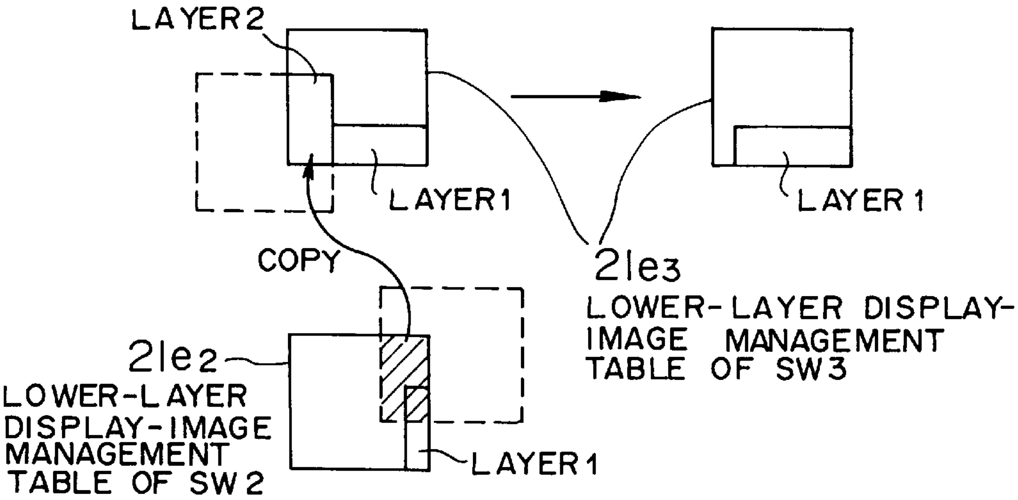

(2) Likewise, in the absence of the shifted switch image SW2, the layer information (lower-layer display-image management table) 21$e_3$ of the switch image SW3 superimposed on the switch image SW2 prior to the shifting operation should be changed from the left-hand side image to the right-hand side image of FIG. 6C. This necessitates the rewriting of the lower-layer display-image management table 21$e_3$ shown in the left-hand side of FIG. 6C by the right-hand side of FIG. 6C. Consequently, the portion of the layer information of the lower-layer display image 21$e_2$ of the switch image SW2 superimposed on the switch image SW3 (hatched portion of FIG. 6C) is copied onto the management table 21$e_3$ of the switch image SW3 superimposed on the switch image SW2. Thus, the management table 21$e_3$ of the switch image SW3 free of the switch image SW2 can be obtained, as shown in the right-hand side of FIG. 6C.

Figure 7A:
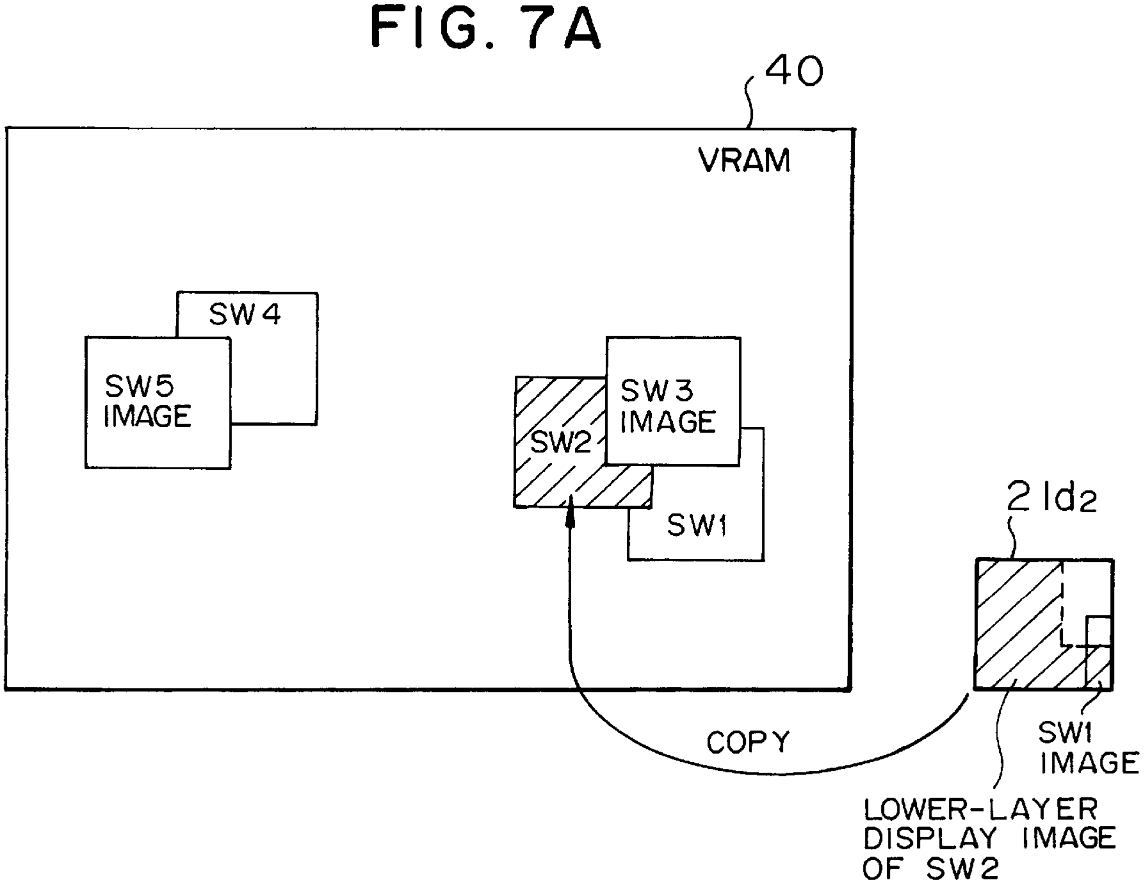
FIGS. 7A and 7B illustrate the updating operation of the VRAM (display screen)
Figure 7B:
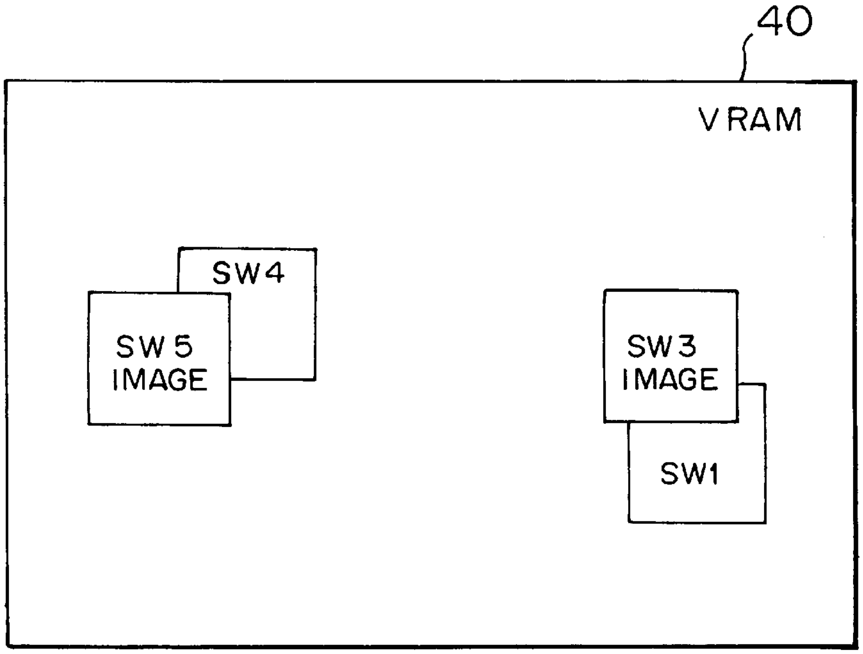

(3) In the absence of the switch image SW2, the contents of the display screen (VRAM) 40 should be changed from FIG. 7A to FIG. 7B. It is thus necessary to copy the portion of the lower-layer display image 21$d_2$ of the switch image SW2 prior to the shifting operation (the hatched portion on the right-hand side of FIG. 7A) onto the corresponding portion of the VRAM 40 (indicated by the hatched portion on the left-hand side of FIG. 7A). As a result, the display image of the VRAM 40 can be obtained, free of the switch image SW2, as shown in FIG. 7B.

Figure 8A:
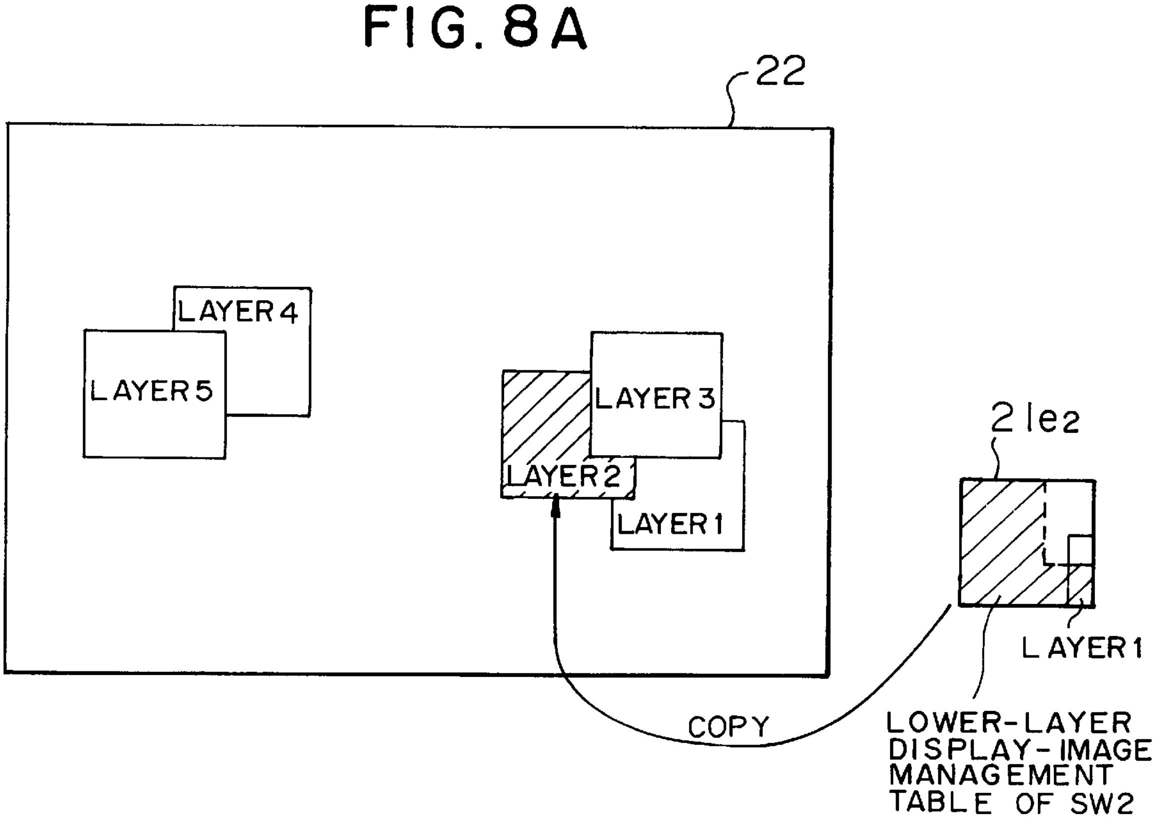
FIGS. 8A and 8B illustrate the display-screen management table.
Figure 8B:
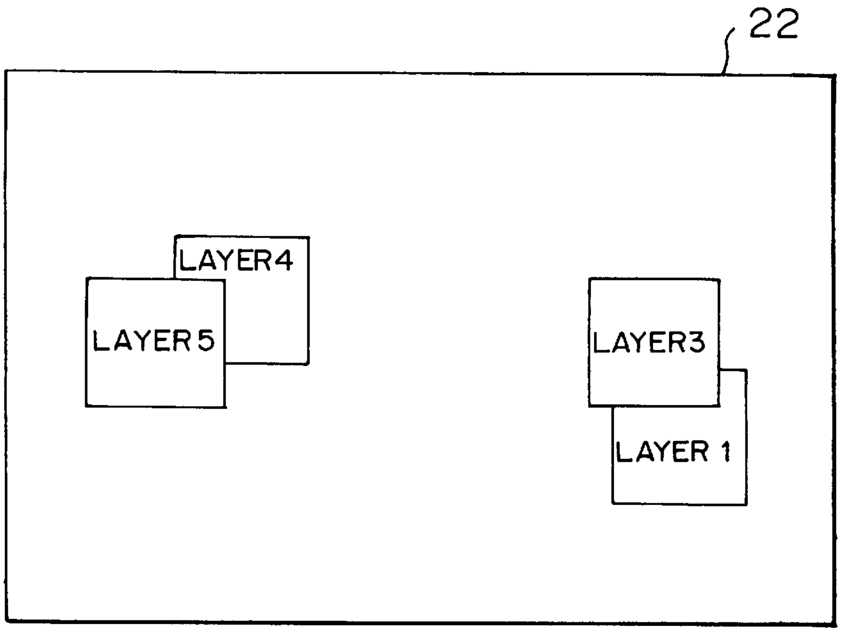

(4) Similarly, the contents of the lower-layer display-screen management table 22 should be changed from FIG. 8A to FIG. 8B. It is thus necessary to copy the portion of the lower-layer display-image management table 21$e_2$ of the switch image SW2 prior to the shifting operation (the hatched portion on the right-hand side of FIG. 8A) onto the corresponding portion of the management table 22 (indicated by the hatched portion on the left-hand side of FIG. 8A). This makes it possible to attain the display-image management table 22, free of the switch image SW2, as shown in FIG. 8B.

(c) Checking for Image Superimposition (Step 103)

Figure 9A:
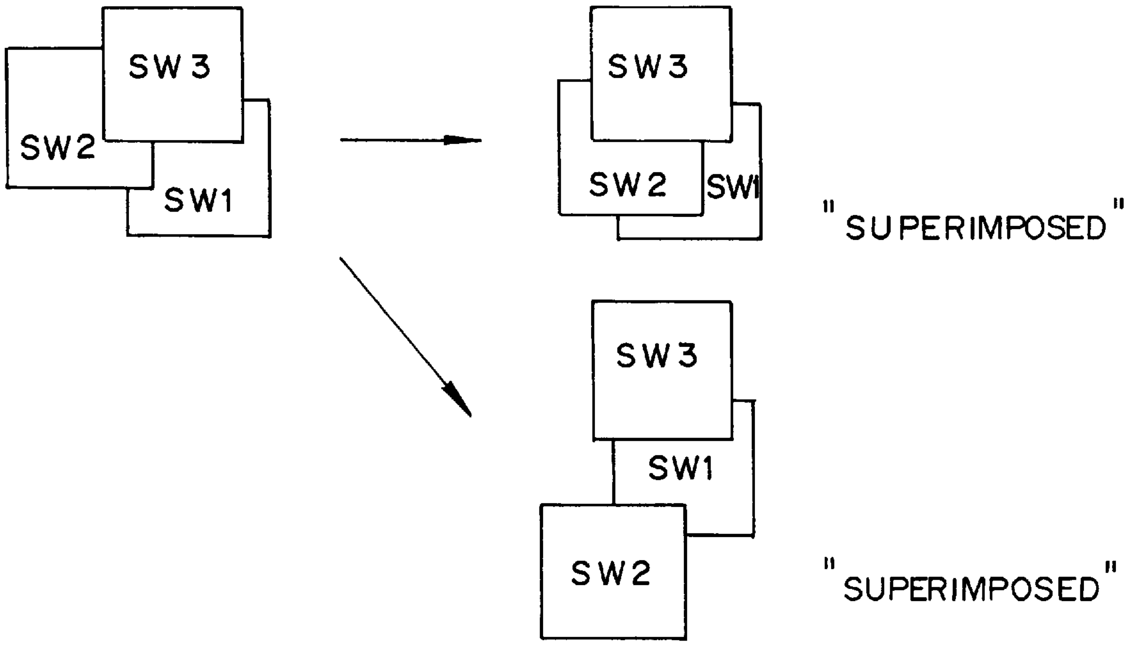
FIGS. 9A and 9B illustrate shifting patterns of the switch images.
Figure 9B:
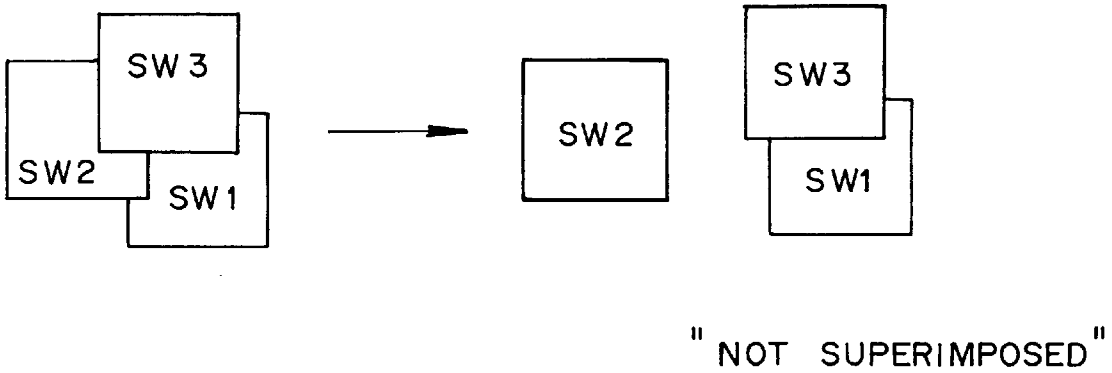

Upon completion of the processing of the rearrangement of the various tables in the absence of the shifted switch image in step 102, it is determined in step 103 whether the shifted switch image is superimposed on any of the previously-superimposed images after the shifting operation. FIG. 9 illustrates the checking for the image superimposition. The answer of step 103 is yes if the shifted switch image SW2 is superimposed, as shown in FIG. 9A, on any of the previously-superimposed images SW1 and SW3. On the other hand, the answer of step 103 is no if the shifted switch image SW2 is not superimposed on either of the previously-superimposed images SW1 or SW3, as illustrated in FIG. 9B.

This check can be made in the following manner. The display zone of the switch image SW2 is determined based on the display position and the size of the shifted switch image SW2 (the size of the individual images is fixed). Then, the display zone of the switch image SW2 is checked to determine whether it is superimposed on any of the switch images SW1 and SW3. For example, (1) the individual pixels of the lower-layer switch image SW1 are checked to determine whether there are any pixels superimposed on the shifted switch image SW2, and similarly, (2) the individual pixels of the shifted switch image SW2 are checked to determine whether there are any pixels superimposed on the higher-layer switch image SW3.

(d) Sorting of Layer Numbers (Steps 103 through 105)

If it is found that the shifted switch image SW2 is not superimposed on either of the images SW1 or SW3, the layer numbers are sorted for rearrangement. On the other hand, if it is found that the switch image SW2 is superimposed on any of the switches SW1 and SW3, the layer numbers are not sorted. FIGS. 10 through 12 illustrate the sorting operation of the switch-image management tables, the display-screen management table and the switch-image management table of the switch SW2, respectively. It should be noted that "sorting" specified herein means the rearrangement of the layer numbers.

The following items are sorted: (1) the layer numbers stored in all of the switch-image management tables 21$_1$ through 21$_5$, (2) the layer numbers stored in the lower-layer display-image management tables, and (3) the layer numbers stored in the display-screen management table 22. More specifically, the layer numbers greater than the layer number of the shifted switch image SW2 are subtracted by one, and in other cases, the layer numbers are unchanged. Then, the layer number of the image SW2 is changed to the highest number.

Figure 10A:
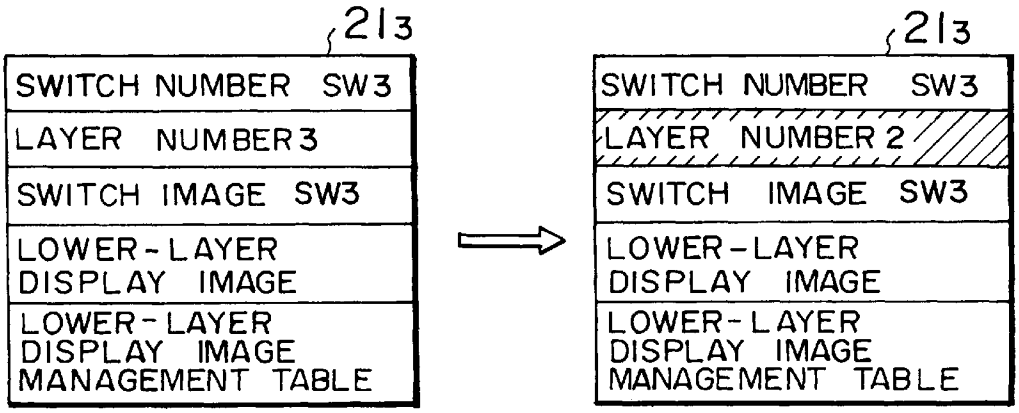
FIGS. 10A through 10C illustrate the sorting operation of the switch-image management tables.
Figure 10B:
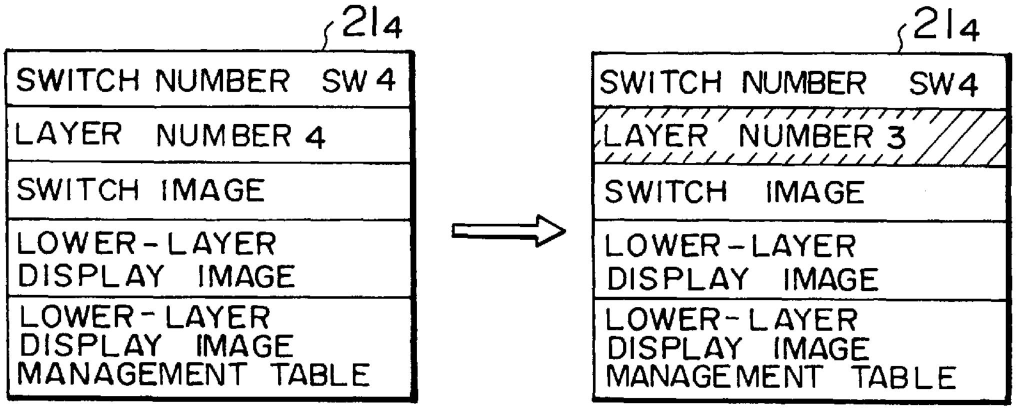
Figure 10C:
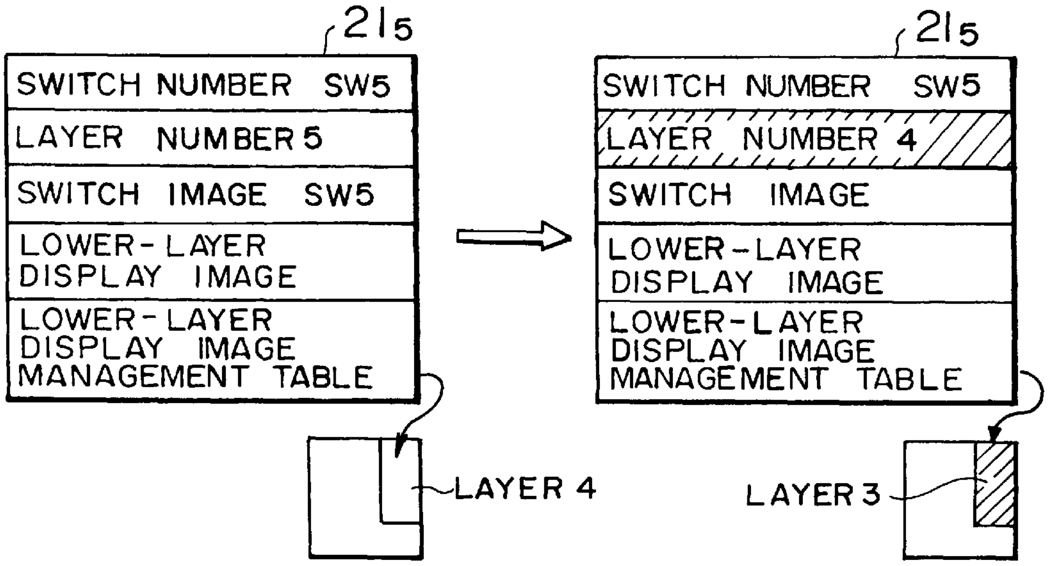

For example, on the display screen shown in FIG. 4A, if the shifted switch image SW2 is not superimposed, as illustrated in FIG. 9B, on either of the previously-superimposed images SW1 or SW3, the layer numbers stored in the respective switch-image management tables 21$_3$, 21$_4$ and 21$_5$ greater than the layer number 2 of the image SW2 are subtracted by one, i.e., the management tables 21$_3$, 21$_4$ and 21$_5$ are changed from the left-hand side to the right-hand side of FIGS. 10A, 10B and 10C, respectively. More specifically, the layer number in the switch-image management table 21$_3$ of the switch image SW3 is changed from 3 to 2; the layer number in the switch-image management table 21$_4$ of the switch image SW4 is changed from 4 to 3; and the layer number in the switch-image management table 21$_5$ of the switch image SW5 is changed from 5 to 4. Simultaneously, the layer number of the lower-layer display-image management table of the switch image SW5 is changed from 4 to 3.

Figure 11A:
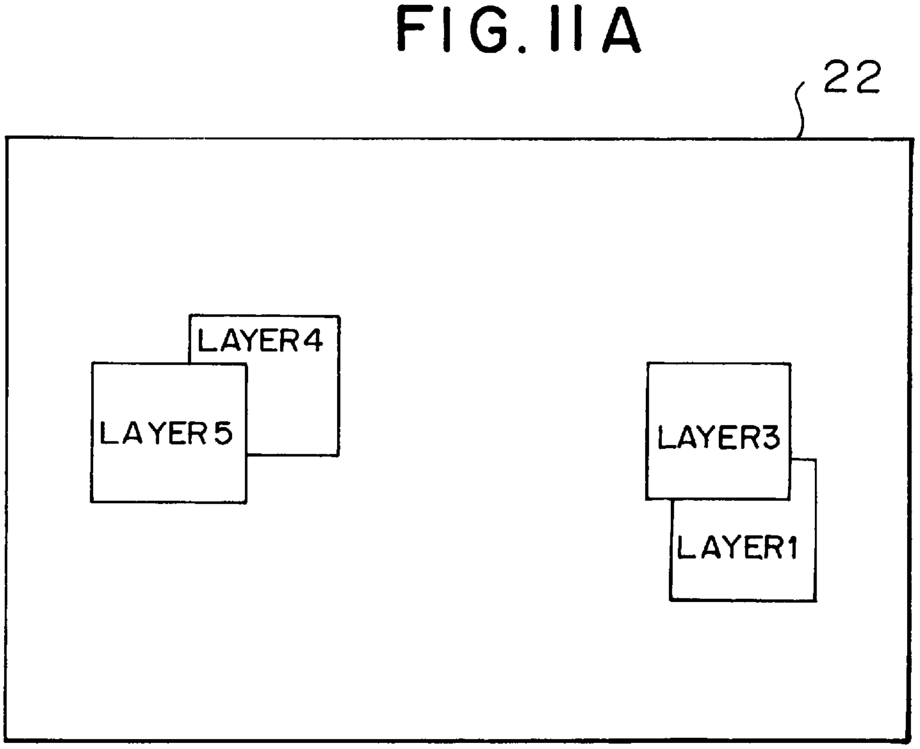
FIGS. 11A and 11B illustrate the sorting operation of the display-screen management table.
Figure 11B:
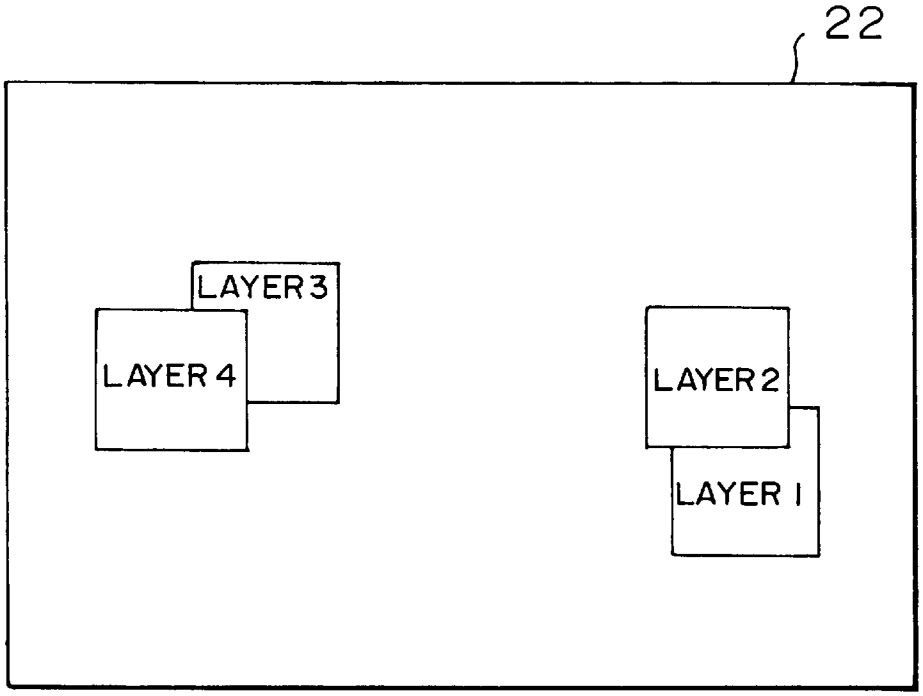
Figure 12:
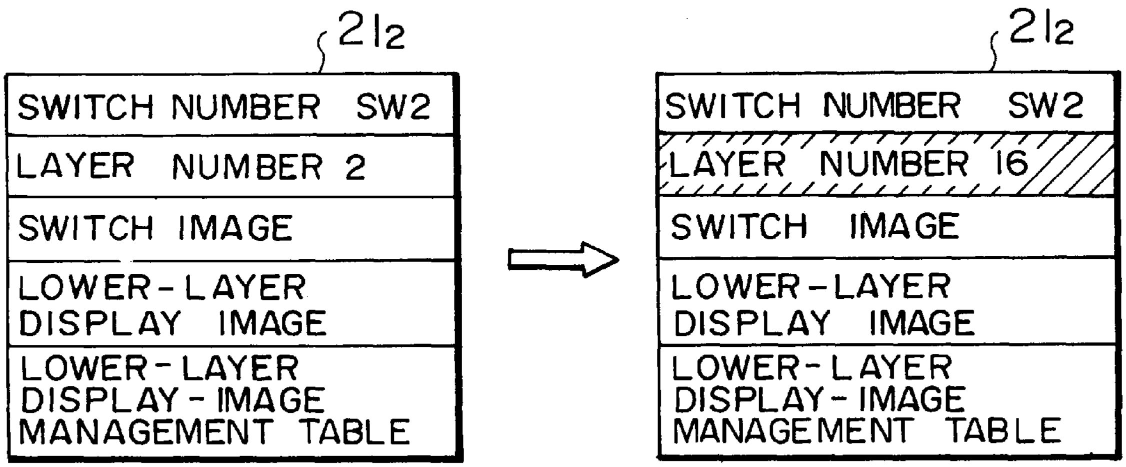
FIG. 12 illustrates the sorting operation of the switch-image management table.

Moreover, the layer numbers stored in the layer information of the display-screen management table 22 greater than the layer number 2 of the switch image SW2 are subtracted by one, so that the management table 22 is transformed from FIG. 11A to FIG. 11B. Additionally, the layer number of the switch-image management table 21$_2$ of the shifted switch image SW2 is changed from 2 to the highest layer number (for example, 16), as illustrated in FIG. 12.

With this sorting operation, even though the shifted switch image is superimposed on other switch images which have not been superimposed previously, it can be displayed on the frontmost position of the screen. This makes it possible to shift a plurality of desired switch images by the operator as required and to rearrange the shifted images into groups. Also, the switch images can be superimposed as desired according to the frequency of the use of the switch images or according to the types of switches.

(e) Updating of the Display Screen and Various Tables after the Shifting Operation (Step 106)

Upon completion of the sorting operation, the display screen and the various tables are updated after the shifting operation. This updating processing is executed in different ways depending upon the presence of the higher-layer images superimposed on the shifted switch image.

(e-1) In the Absence of Higher-layer Switch Images after the Shifting Operation

The above case can be considered (1) when the shifted switch image is not superimposed on any of the previously-superimposed images (FIG. 9B) or (2) when the shifted switch image is not superimposed on the previously-superimposed switch images of the higher layers but is still superimposed on the switch image of the lower layer (FIG. 9A).

Figure 13:
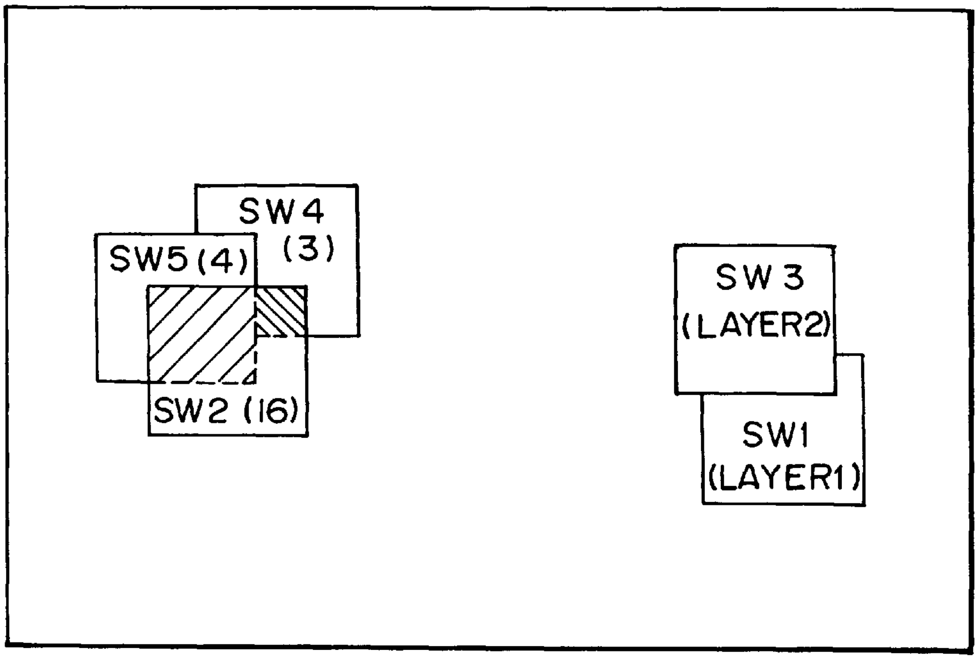
FIG. 13 illustrates the shifting pattern of the switch images.

FIG. 13 illustrates an example in which the switch image SW2 shown in FIG. 4A is shifted and is not superimposed on any of the previously-superimposed switch images SW1 and SW3 but is superimposed on other switch images SW4 and SW5 which have not been superimposed previously. In this case, there are no higher-layer images than the switch image SW2, so that the image SW2 can be placed on the frontmost position of the screen. It is thus necessary to (1) update the lower-layer display image 21$d_2$ and the lower-layer display-image management table 21$e_2$ of the highest-layer switch image SW2 and also to (2) update the display-screen management table 22 and the VRAM 40.

Figure 14:
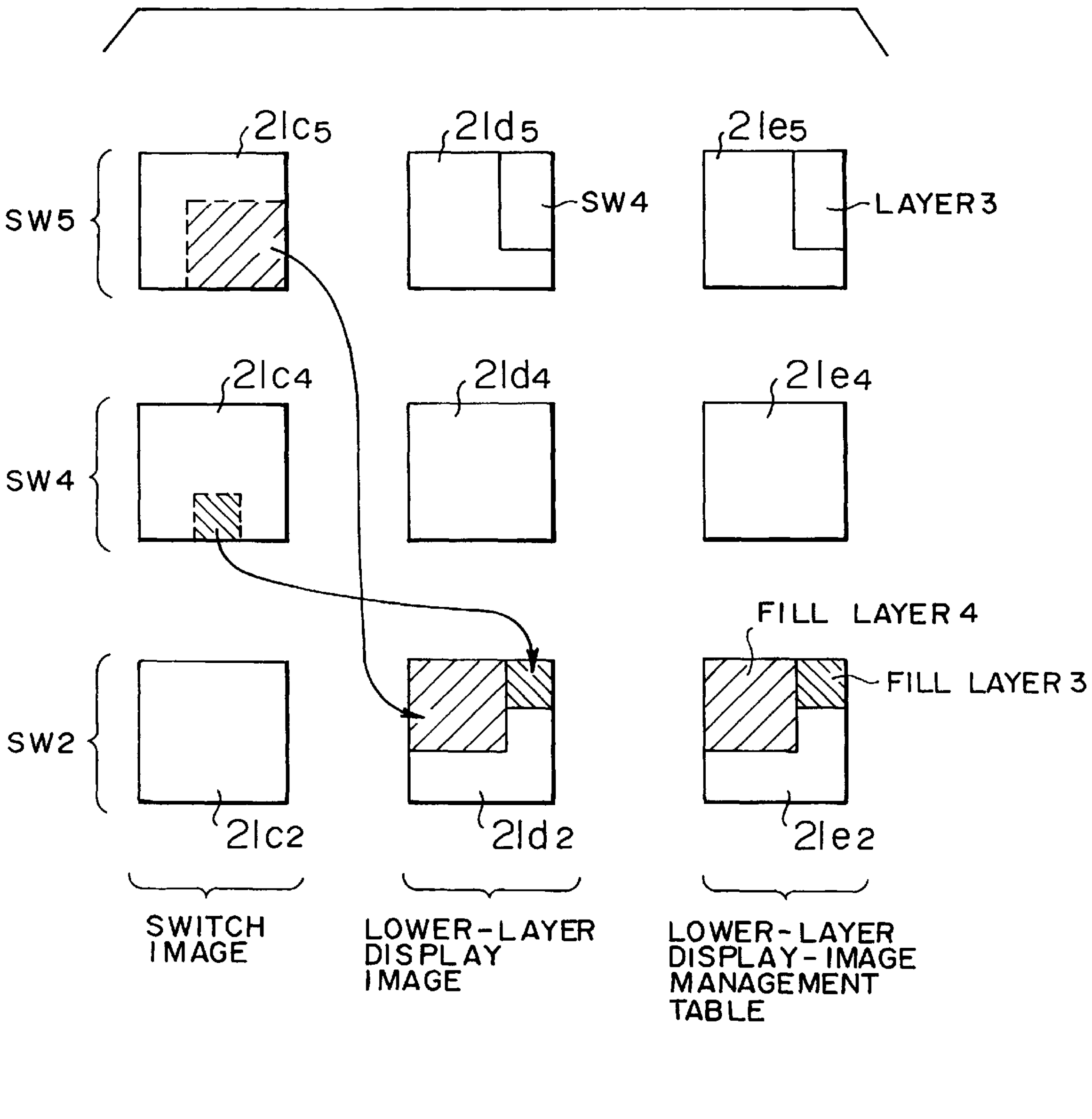
FIG. 14 illustrates the updating operation of the switch-image management table of the shifted switch image (when there are no higher-layer switch images superimposed on the shifted image after the shifting operation)

FIG. 14 illustrates the updating operation of the lower-layer display image 21$d_2$ and the lower-layer display-image management table 21$e_2$ of the shifted switch image SW2. FIG. 14 shows the switch image data 21$c_5$, the lower-layer display image 21$d_5$ and the lower-layer display-image management table 21$e_5$ of the switch image SW5, the switch image data 21$c_4$, the lower-layer display image 21$d_4$ and the lower-layer display-image management table 21$e_4$ of the switch image SW4, and the switch image data 21$c_2$, the lower-layer display image 21$d_2$ and the lower-layer display-image management table 21$e_2$ of the switch image SW2.

All of the pixels of the lower-layer switch image SW4 are first checked to determine whether there are any pixels superimposed only on the shifted switch image SW2. If there are any corresponding pixels (indicated by the hatched portion descending in the rightward direction in FIGS. 13 and 14), the image data on the pixels of the switch image SW4 is captured as the lower-layer display image 21$d_2$ of the shifted switch image SW2. Simultaneously, "layer 3" of the switch image SW4 is written as the lower-layer information 21$e_2$ of the switch image SW2. Subsequently, all of the pixels of the switch image SW5 are checked whether there are any pixels superimposed only on the shifted switch image SW2. If there are any corresponding pixels (indicated by the hatched portion descending in the leftward direction in FIGS. 13 and 14), the image data on the corresponding pixels of the switch image SW5 is captured as the lower-layer display image 21$d_2$ of the shifted switch image SW2. Concurrently, "layer 4" of the switch image SW5 is written as the lower-layer information 21$e_2$ of the switch image SW2. In this manner, the updating operation of the lower-layer display image 21$d_2$ and the lower-layer display-image management table 21$e_2$ of the shifted switch image SW2 is completed.

Figure 15A:
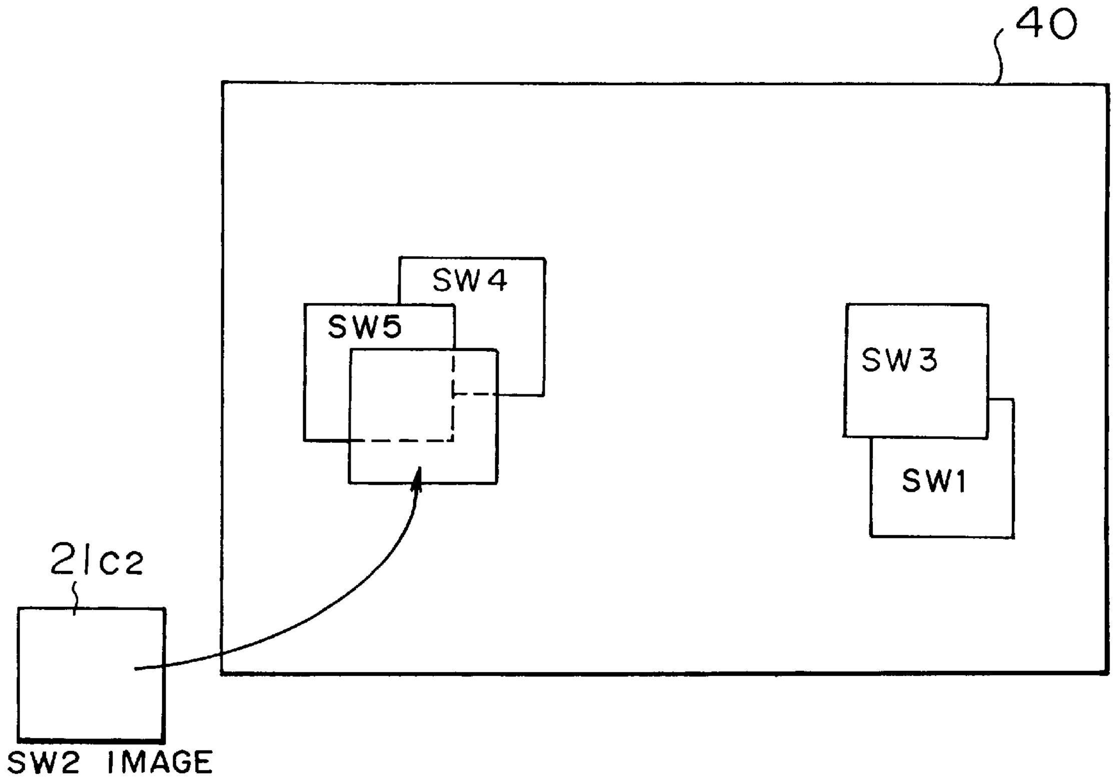
FIGS. 15A and 15B illustrate the updating operation of the display screen and the display-screen management table, respectively, (when there are no higher-layer switch images superimposed on the shifted image after the shifting operation)
Figure 15B:
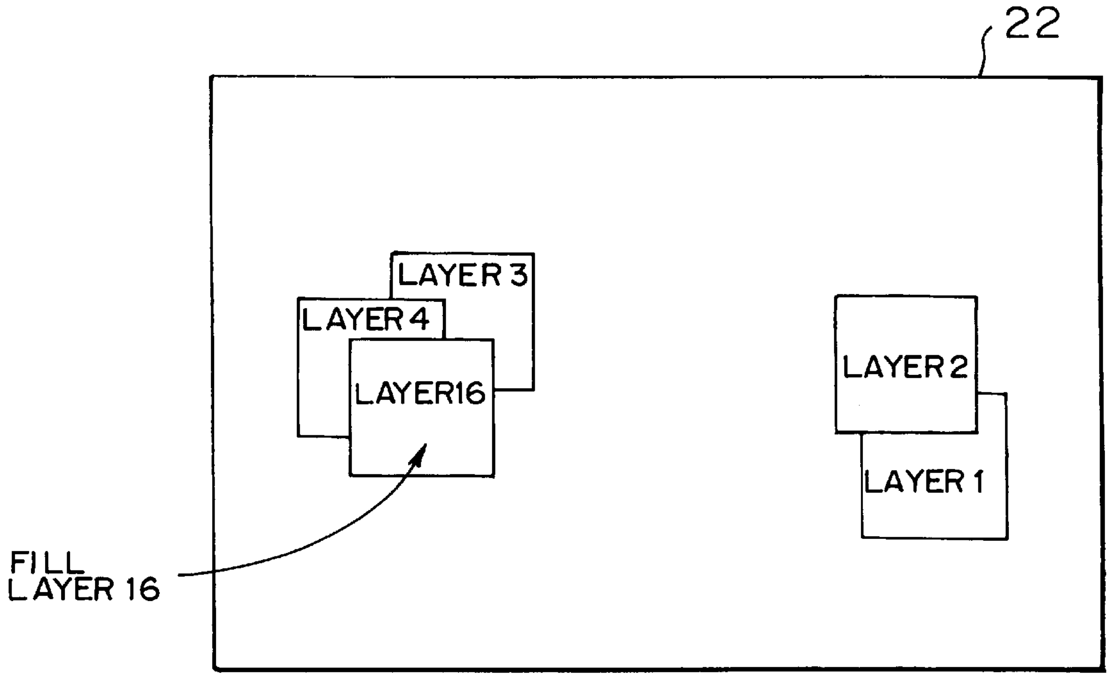

FIG. 15 illustrates the updating operation of the display screen (VRAM) 40 and the display-screen management table 22. The VRAM 40 is updated, as shown in FIG. 15A, by writing the shifted switch image SW2 into the associated position of the VRAM 40. On the other hand, the display-image management table 22 is updated, as illustrated in FIG. 15B, by writing the layer number 16 of the switch image SW2 into the storage position of the table 22. Subsequent to this processing, the bit-map image data is read from the VRAM 40 by raster scanning, and the shifted switch image is output to the display.

(e-2) In the Presence of Higher-layer Switch Images after the Shifting Operation This case can be considered when the shifted switch image is still superimposed on the previously-superimposed higher-layer switch image (upper part of FIG. 9A). In this case, it is necessary to (1) update the lower-layer display image of the higher-layer switch image SW3 with the use of the switch image SW2 according to the superimposition state of the images SW2 and SW3, (2) update the lower-layer display image of the switch image SW2 with the use of the lower-layer switch image SW1 according to the superimposition state of the switches SW2 and SW1, and (3) rewrite the contents of the VRAM 40 so that the higher-layer switch image SW3, the shifted switch image SW2 and the lower-layer switch image SW1 can be superimposed in the descending layer order. It is also necessary to rewrite the layer information stored in the display-screen management table 22.

FIG. 16 illustrates the updating operation of the lower-layer display images and the lower-layer display-image management tables of the switch images (the higher-layer switch image and the shifted switch image). In FIG. 16, there are shown the switch image data 21$c_3$, the lower-layer display image 21$d_3$ and the lower-layer display-image management table 21$e_3$ of the switch image SW3, the switch image data 21$c_2$, the lower-layer display image 21$d_2$ and the lower-layer display-image management table 21$e_2$ of the switch image SW2, and the switch image data 21$c_1$, the lower-layer display image 21$d_1$ and the lower-layer display-image management table 21$e_1$ of the switch image SW1.

Figure 16A:
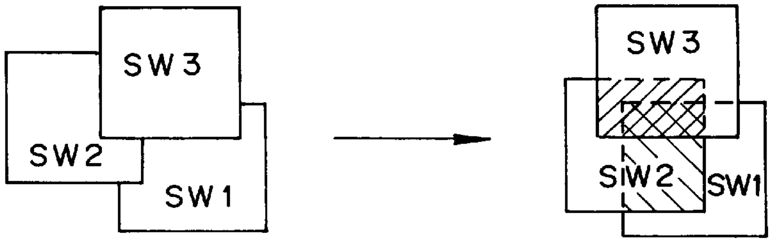
FIGS. 16A through 16D illustrate the updating operation of the switch-image management tables of the switch images (when there are higher-layer switch images superimposed on the shifted image after the shifting operation)
Figure 16B:
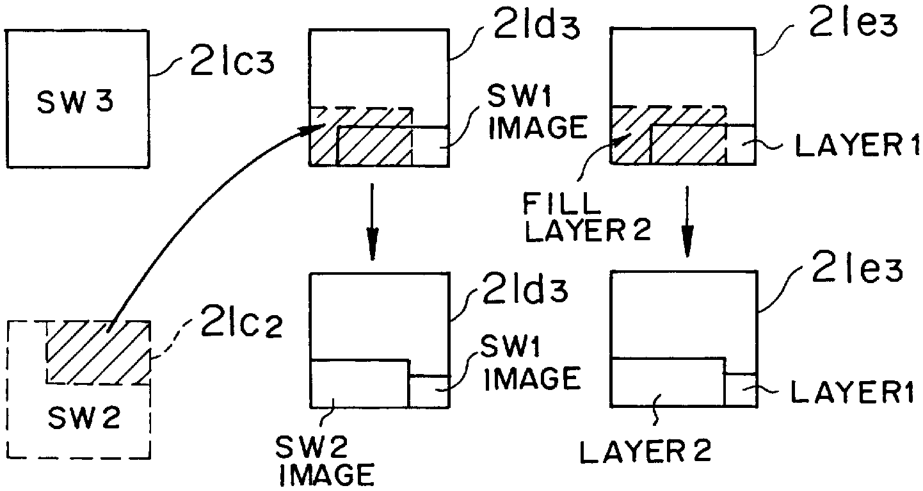
Figure 16C:
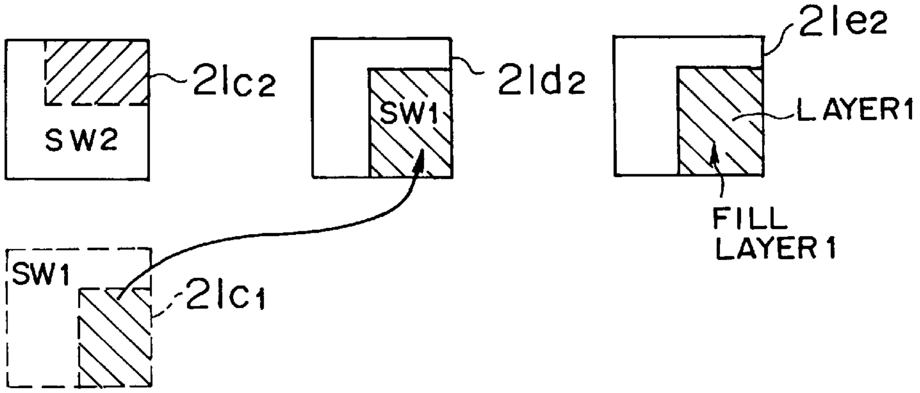
Figure 16D:
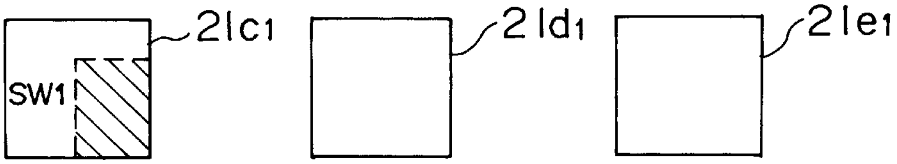

Assuming that the switch-image management table illustrating the superimposition state is transformed from the left-hand side to the right-hand side of FIG. 16A, the lower-layer display image 21$d_3$ and the lower-layer display-image management table 21$e_3$ of the higher-layer switch image SW3 can be indicated, as shown in the upper part of FIG. 16B, by virtue of the processing of step 102. In this state, all of the pixels of the shifted switch image SW2 are checked to determine whether there are any pixels superimposed on the higher-layer switch image SW3. If there are any associated pixels (indicated by the hatched portion ascending in the rightward direction), the image data of the corresponding pixels is written as the lower-layer display image 21$d_3$ of the switch image SW3, and concurrently, "layer 2" of the shifted switch image SW2 is written into the lower-layer display-image management table 21$e_3$ of the switch image SW3. The above-described processing causes the lower-layer display image 21$d_3$ and the lower-layer display-image management table 21$e_3$ to be transformed into the state shown in the lower part of FIG. 16B. Namely, when the shifted switch image SW2 is superimposed on the higher-layer switch image SW3, the lower-layer display image 21$d_3$ and the lower-layer display-image management table 21$e_3$ of the switch image SW3 can be updated.

Thereafter, all of the pixels of the lower-layer switch image SW1 are checked to determined whether there are any pixels superimposed on the shifted switch image SW2. If there are any corresponding pixels (indicated by the hatched portion ascending in the leftward direction), the image data of the associated pixels is written as the lower-layer display image 21$d_2$ of the switch image SW2, and at the same time, "layer 1" of the switch image SW1 is written into the lower-layer display-image management table 21$e_2$ of the switch image SW2. The above-described processing makes it possible to generate the lower-layer display image 21$d_2$ and the lower-layer display-image management table 21$e_2$. Namely, when the shifted switch image SW2 is superimposed on the lower-layer switch image SW1, the lower-layer display image 21$d_2$ and the lower-layer display-image management table 21$e_2$ of the switch image SW2 can be generated.

Figure 17A:
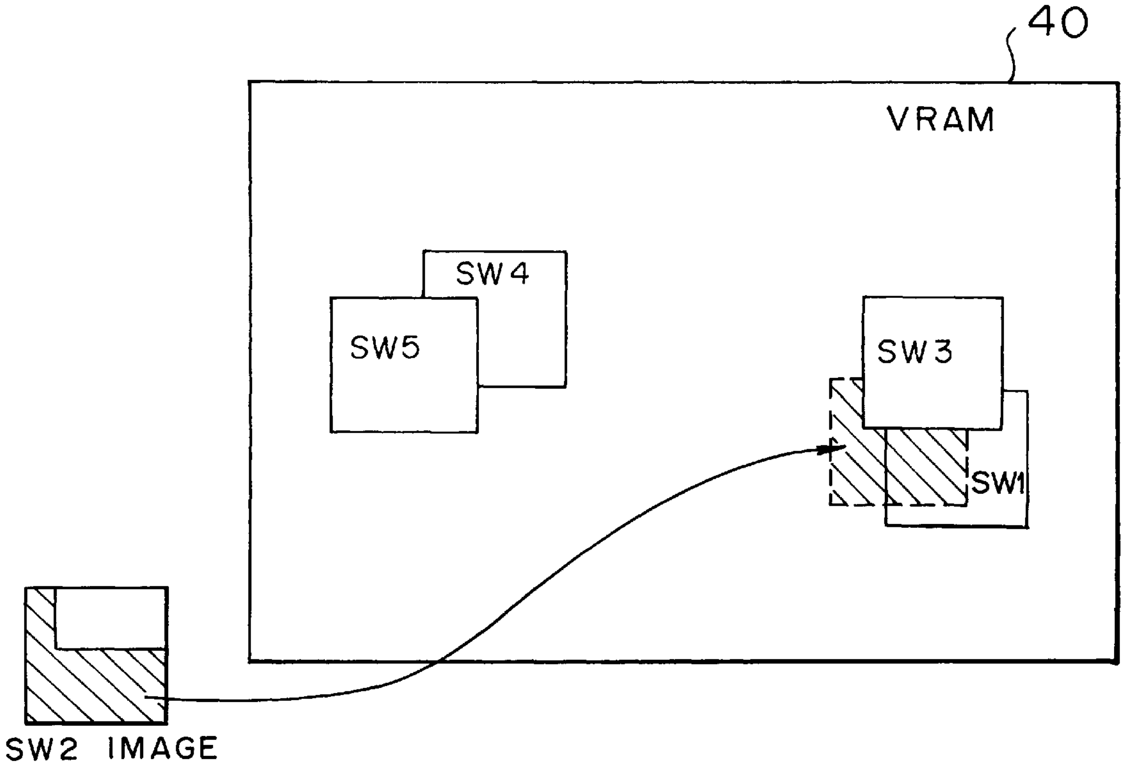
FIGS. 17A and 17B illustrate the updating operation of the display screen and the display-screen management table, respectively (when there are higher-layer switch images superimposed on the shifted image after the shifting operation).
Figure 17B:
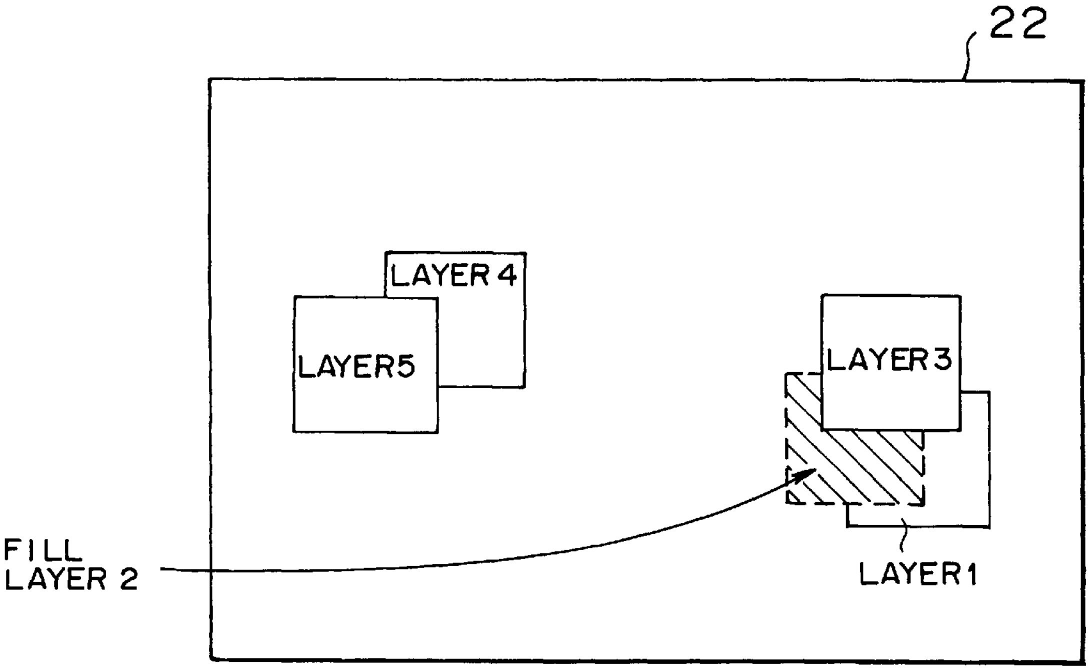

FIG. 17 illustrates the updating operation of the display screen (VRAM) 40 and the display-screen management table 22. The VRAM 40 can be updated, as shown in FIG. 17A, by writing the shifted switch image SW2 into the associated position of the VRAM 40. On the other hand, the display-screen management table 22 can be updated, as illustrated in FIG. 17B, by writing the layer number 2 of the switch image SW2 into the corresponding position of the table 22. More specifically, all of the pixels of the shifted switch image SW2 are checked to determine whether there are any pixels superimposed on the higher-layer switch image SW3. If there are any associated pixels which are not superimposed on the image SW3 (indicated by the hatched portion descending in the rightward direction of FIG. 17A), the image data of the corresponding pixels is written into the associated position of the VRAM 40, and simultaneously, the "layer 2" of the switch image SW2 is written into the corresponding position of the display-image management table 22. In this fashion, the updating operation of the display screen (VRAM) 40 and the various tables are completed. Then, the bit-map image data is read from the VRAM 40 by raster scanning, and the shifted switch image can be output to the display.

As will be clearly understood from the foregoing description, the present invention offers the following advantages.

A plurality of classes forming the hierarchical structure from the highest to the lowest layers are provided, and the layer number and the switch image data of each switch image are managed. If switch images are superimposed on each other, the higher-layer image is displayed on the lower-layer image. Accordingly, a selected switch image can be avoided from being displayed on the frontmost position of the display screen unless the structure of the layers of the switch images are changed. This prevents the destruction of the hierarchical structure of the switch images.

If a predetermined shifted switch image is not superimposed on any of the previously-superimposed images, the layer numbers of all of the switch images higher than the lower number of the shifted switch image are subtracted by one, and the layer number of the shifted switch image is set to be the highest. At the same time, the shifted switch image is written into the corresponding position of the screen memory, so that the overall shifted switch image can be displayed on the frontmost position of the screen. It is thus possible to freely shift desired switch images and group them by the operator and also to classify and superimpose the images as desired and display them according to the frequency of the use of images or according to the types of switches. This enhances the easy selection of switches.

Further, there is provided a display-screen management table for storing the layer information of the switch images to be displayed on the individual pixels of the screen. Also, the lower-layer display image of each switch image and the layer information of the lower-layer display image for each pixel are managed. By use of the lower-layer display image and its layer information during the shifting operation, the contents of the screen memory (VRAM) and the display-screen management table are rewritten, thereby enabling the high-speed shifting and superimposing operation.

Further, even though the switch images are superimposed on each other, the layer number of the image designated by a cursor can be found by referring to the display-screen management table, so that the specified switch image can be identified correctly based on the determined layer number and the display position data of the respective switch images. Thus, the switch image can be selected or shifted on the display screen.

Moreover, if a predetermined shifted switch image is superimposed on other switch images which have not been superimposed previously, the lower-layer display image of the highest-layer shifted switch image is updated by use of the superimposed portion of the other switch image with the shifted image. Hence, the lower-layer display image of the shifted switch image can be rewritten at high speed.

Additionally, if a shifted switch image is still superimposed on at least one of the previously-superimposed images, the contents of the screen memory is rewritten so that the higher-layer switch image, the shifted switch image, and the lower-layer switch image can be displayed in the superimposition state in the descending layer order. Simultaneously, the layer information stored in the display-screen management table is rewritten. Also, the lower-layer display image of the higher-layer switch image is updated in accordance with the superimposition state between the higher-layer image and the shifted image, and the lower-layer display image of the shifted switch image is updated according to the superimposition state between the shifted image and the lower-layer switch image. This achieves the faster shifting and superimposing operation even though the shifted switch image is still superimposed on at least one of the previously-superimposed images.

While the present invention has been described with reference to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A switch-image display method for displaying a plurality of switch images on a display screen, each of the switch images being selectable by a cursor to control a predetermined operation, said method comprising assigning to each of the plurality of switch images a unique layer number from a range including a lowest layer number and a highest layer number, and displaying the plurality of switch images on the display screen in accordance with the assigned layer numbers so that a higher-layer number switch image is superimposed on a lower-layer number switch image, wherein the selection of a particular switch image to control its associated operation does not change the layer numbering of the switch images, so that the layering of the switch images on the display screen is not changed.

2. A switch-image display method according to claim 1, wherein the layer number and the switch image data of each switch image are managed.

3. A switch-image display method according to claim 1, wherein the step of displaying comprises checking individual pixels forming each of said switch images to determine whether any of said pixels are superimposed on a higher-layer switch image, and the switch image is displayed in such a manner that image data associated with the pixels which are not superimposed on the higher-layer switch image is written into a screen memory and that image data associated with the pixels superimposed on the higher-layer switch image is not written into the memory.

4. A switch-image display method according to claim 3, wherein said screen memory is a VRAM.

5. A switch-image display method for displaying a plurality of switch images on a display screen each of the switch images being selectable by a cursor to control a predetermined operation said method comprising:

assigning to each of the plurality of switch images a unique layer number from a range including a lowest layer number and a highest layer number, and displaying the plurality of switch images on the display screen in accordance with the assigned layer numbers so that a higher-layer number switch image is superimposed on a lower-layer number switch image; the method further comprising, providing a display-screen management table for storing the layer number of each switch image to be displayed on the individual pixels of the display screen;

managing (a) image data for a zone in which said switch image is displayable assuming that there are no higher-layer switch images including said image (lower-layer display image) and (b) layer information of said lower-layer display image for each pixel; and executing, on the condition that a switch image is shifted and is thus absent, (i) rewriting the contents of a zone of a screen memory in which said switch image to be shifted has been stored by the corresponding zone of the lower-layer display image of said shifted switch image, (ii) updating the lower-layer display image of a higher-layer switch image superimposed on said switch image to be shifted by use of the lower-layer display image of said shifted switch image, (iii) rewriting the contents of a zone of said display-screen management table in which the layer number of said shifted switch image is stored by the layer information of the lower-layer display image of said shifted switch image, and (iv) updating the layer information of the lower-layer display image of a lower-layer switch image superimposed on said switch image to be shifted by use of the layer information of the lower-layer display image of said shifted switch image.

6. A switch-image display method according to claim 5, wherein the layer number of a zone in which designation means are positioned is found by referring to said display-screen management table, and the switch image designated by said designation means is identified based on said layer number and display position data of each switch image, so that said switch image is shiftable on the display screen.

7. A switch-image display method according to claim 6, wherein the layer numbers of the switch images higher than the layer number of the shifted switch image are subtracted by one, and the layer number of the shifted switch image is set to be the highest number if the shifted switch image is not superimposed on any of the previously-superimposed switch images, and wherein the shifted switch image is written into the corresponding zone of said screen memory, so that the overall shifted switch image is displayed on the frontmost position of the screen.

8. A switch-image display method according to claim 7, wherein the lower-layer display image of the shifted switch image is updated by a superimposed portion of a lower-layer switch image with the highest-layer shifted switch image if the shifted switch image is superimposed on other switch images which have not been superimposed previously.

9. A switch-image display method according to claim 5, further comprising: when the shifted switch image is still superimposed on at least one of the previously-superimposed switch images, rewriting the contents of said screen memory so that the higher-layer switch image, the shifted switch image and the lower-layer switch image are superimposed in the descending layer order to be displayed, and also rewriting the layer information of said display-screen management table;

updating the lower-layer display image of a switch image higher than the shifted switch image in accordance with the superimposition state of the higher-layer switch image and the shifted switch image by use of the shifted switch image; and updating the lower-layer display image of the shifted switch image according to the superimposition state of the shifted switch image and a lower-layer switch image by use of the lower-layer switch image.

10. A switch-image display apparatus for displaying a plurality of superimposed switch images which cause a system to perform a predetermined operation, said apparatus comprising:

a selection section for selecting a switch image;

a memory for storing a switch-image management table, a display-screen management table and display-position data of each of said switch images;

an image processing section for performing image processing in order to superimpose switch images disposed on layer classes arranged from the lowest layer to the highest layer;

a screen memory for storing predetermined image data processed by said image processing section; and a display controller for reading the image data stored in said screen memory and inputting the read image data into a display, wherein the selection of a particular switch image to control its associated operation does not chance the layer numbering of the switch images, so that the layering of the switch images on the display screen is not changed.

11. A switch-image display apparatus according to claim 10, wherein said switch-image management table stores (a) a switch number inherently associated with each of the switch images, (b) the layer number of the layer corresponding to each of the switch images, (c) the image data associated with each of the switch images, (d) the image data for a zone in which a switch image is displayed on the display screen when there are no higher-layer switch images superimposed on the zone of the switch image, and (e) layer information associated with a lower-layer display image for each pixel.

12. A switch-image display apparatus according to claim 10, wherein said display-screen management table stores layer information associated with a switch image to be displayed on the pixels of the display screen.

13. A switch-image display method for superimposing a plurality of switch images, each of which cause a system to perform a predetermined operation, and displaying the superimposed images onto a display screen, said method comprising:

disposing a plurality of layer classes arranged from the lowest layer to the highest layer;

managing the layer number and switch image data of each of said switch images; and displaying a higher-layer switch image on a lower-layer switch image if the switch images are superimposed on each other, wherein the selection of a particular switch image to control its associated operation does not change the layer numbering of the switch images, so that the layering of the switch images on the display screen is not changed.

14. A switch-image display method according to claim 13, wherein the step of displaying comprises checking individual pixels forming each of said switch images to determine whether any of said pixels are superimposed on a higher-layer switch image, and the switch image is displayed in such a manner that image data associated with the pixels which are not superimposed on the higher-layer switch image is written into a screen memory and that image data associated with the pixels superimposed on the higher-layer switch image is not written into the memory.

15. A switch-image display method for superimposing a plurality of switch images, each of which cause a system to perform a predetermined operation, and displaying the superimposed images onto a display screen said method comprising:

disposing a plurality of layer classes arranged from the lowest layer to the highest layer:

managing the layer number and switch image data of each of said switch images; and displaying a higher-layer switch image on a lower-layer switch image if the switch images are superimposed on each other; wherein the method further comprises, providing a display-screen management table for storing the layer number of each switch image to be displayed on the individual pixels of a display screen; and managing (a) image data for a zone in which said switch image is displayable assuming that there are no higher-layer switch images including said image (lower-layer display image) and (b) layer information of said lower-layer display image for each pixel; and executing, on the condition that a switch image is shifted and is thus absent, (i) rewriting the contents of a zone of a screen memory in which said switch image to be shifted has been stored by the corresponding zone of the lower-layer display image of said shifted switch image, (ii) updating the lower-layer display image of a higher-layer switch image superimposed on said switch image to be shifted by use of the lower-layer display image of said shifted switch image, (iii) rewriting the contents of a zone of said display-screen management table in which the layer number of said shifted switch image is stored by the layer information of the lower-layer display image of said shifted switch image, and (iv) updating the layer information of the lower-layer display image of a lower-layer switch image superimposed on said switch image to be shifted by use of the layer information of the lower-layer display image of said shifted switch image.

16. A switch-image display method according to claim 15, wherein the layer number of a zone in which designation means are positioned is found by referring to said display-screen management table, and the switch image designated by said designation means is identified based on said layer number and display position data of each switch image, so that said switch image is shiftable on the display screen.

17. A switch-image display method according to claim 16, wherein the layer numbers of the switch images higher than the layer number of the shifted switch image are subtracted by one, and the layer number of the shifted switch image is set to be the highest number if the shifted switch image is not superimposed on any of the previously-superimposed switch images, and wherein the shifted switch image is written into the corresponding zone of said screen memory, so that the overall shifted switch image is displayed on the frontmost position of the screen.

18. A switch-image display method according to claim 17, wherein the lower-layer display image of the shifted switch image is updated by a superimposed portion of a lower-layer switch image with the highest-layer shifted switch image if the shifted switch image is superimposed on other switch images which have not been superimposed previously.

19. A switch-image display method according to claim 15, further comprising: when the shifted switch image is still superimposed on at least one of the previously-superimposed switch images, rewriting the contents of said screen memory so that the higher-layer switch image, the shifted switch image and the lower-layer switch image are superimposed in the descending layer order to be displayed, and also rewriting the layer information of said display-screen management table;

updating the lower-layer display image of a switch image higher than the shifted switch image in accordance with the superimposition state of the higher-layer switch image and the shifted switch image by use of the shifted switch image; and updating the lower-layer display image of the shifted switch image according to the superimposition state of the shifted switch image and a lower-layer switch image by use of the lower-layer switch image.

20. A switch-image display method for displaying a plurality of switch images on a display screen, each of the switch images being selectable by a cursor to control a predetermined operation, said method comprising:

assigning to each of the plurality of switch images a unique layer number from a range including a lowest layer number and a highest layer number, and displaying the plurality of switch images on the display screen, storing the layer number of each switch image to be displayed on the individual pixels of the display screen in a display-screen management table;

managing lower-layer display image data for a zone in which said each switch image is displayable when there are no higher-layer switch images including said lower-layer display image data and layer information of said lower-layer display image data for each pixel; and executing, on the condition that a switch image is shifted and is thus absent, (i) rewriting the contents of a zone of a screen memory in which said switch image to be shifted has been stored by the corresponding zone of the lower-layer display image of said shifted switch image, (ii) updating the lower-layer display image data of a higher-layer switch image superimposed on said switch image to be shifted by use of the lower-layer display image data of said shifted switch image, (iii) rewriting the contents of a zone of said display-screen management table in which the layer number of said shifted switch image is stored by the layer information of the lower-layer display image data of said shifted switch image, and (iv) updating the layer information of the lower-layer display image data of a lower-layer switch image superimposed on said switch image to be shifted is updated by use of the layer information of the lower-layer display image data of said shifted switch image.

21. A switch-image display method for displaying a plurality of switch images on a display screen, each of the switch images being selectable by a cursor to control a predetermined operation, said method comprising:

assigning to each of the plurality of switch images a unique layer number from a range including a lowest layer number and a highest layer number, managing the layer number and switch image data of each of said switch images;

displaying a higher-layer switch image and a lower-layer switch image such that a portion of the higher-layer switch image is superimposed on a portion of the lower-layer switch image if the portions of the higher-layer and lower layer switch images are located in a common zone of the display screen;

storing the layer number of each switch image to be displayed on the individual pixels of the display screen in a display-screen management table;

managing (a) lower-layer display image data for a zone in which said each switch image is displayable when there are no higher-layer switch images including said lower-layer display image data and (b) layer information of said lower-layer display image data for each pixel; and executing, on the condition that a switch image is shifted and is thus absent, (i) rewriting the contents of a zone of a screen memory in which said switch image to be shifted has been stored by the corresponding zone of the lower-layer display image of said shifted switch image, (ii) updating the lower-layer display image data of a higher-layer switch image superimposed on said switch image to be shifted by use of the lower-layer display image data of said shifted switch image, (iii) rewriting the contents of a zone of said display-screen management table in which the layer number of said shifted switch image is stored by the layer information of the lower-layer display image data of said shifted switch image, and (iv) updating the layer information of the lower-layer display image data of a lower-layer switch image superimposed on said switch image to be shifted is updated by use of the layer information of the lower-layer display image data of said shifted switch image.

* * * * *